United States Patent [19]

Lichfield

[11] Patent Number: 5,058,768

[45] Date of Patent: Oct. 22, 1991

[54] METHODS AND APPARATUS FOR DISPENSING PLURAL FLUIDS IN A PRECISE PROPORTION

[75] Inventor: William H. Lichfield, Corinne, Utah

[73] Assignee: Fountain Technologies, Inc., Utah

[21] Appl. No.: 598,127

[22] Filed: Nov. 13, 1990

Related U.S. Application Data

[63] Continuation of Ser. No. 332,230, Mar. 31, 1989, abandoned.

[51] Int. Cl.[5] ............................................. B67D 5/56
[52] U.S. Cl. ..................................... 222/1; 222/129.1;
 222/129.4; 222/132; 222/137; 222/249;
 222/255; 222/275; 222/309; 222/395; 222/511;
 91/346; 92/13.7; 417/397
[58] Field of Search ...... 222/1, 249, 250, 129.1-129.4,
 222/132, 135, 145, 255, 275, 276, 309, 335, 395,
 511; 417/393, 397, 395; 92/13.7; 91/346

[56] References Cited

U.S. PATENT DOCUMENTS

| | | |
|---|---|---|
| 1,169,666 | 1/1916 | Mayer . |
| 1,366,529 | 1/1921 | Frick . |
| 1,429,574 | 9/1922 | England et al. . |
| 1,533,994 | 9/1925 | Estes . |
| 1,553,994 | 9/1925 | Estes . |
| 1,654,004 | 12/1927 | Lind . |
| 1,906,839 | 5/1933 | Christianson . |
| 1,912,171 | 5/1933 | Austin . |
| 2,201,545 | 5/1940 | Mazzanobile . |
| 2,371,432 | 3/1945 | DiPietro . |
| 2,372,360 | 3/1945 | Cornelius . |
| 2,379,532 | 7/1945 | Lloyd . |
| 2,401,914 | 6/1946 | DiPietro . |
| 2,427,429 | 9/1947 | Waite et al. . |
| 2,434,374 | 1/1948 | Tull . |
| 2,455,681 | 12/1948 | Kantor et al. . |
| 2,462,019 | 2/1949 | Bowman . |
| 2,502,610 | 4/1950 | Wegman . |
| 2,517,301 | 8/1950 | Gottlieb . |
| 2,527,927 | 10/1950 | Grow, Jr. . |
| 2,535,835 | 12/1950 | Burgess . |
| 2,536,400 | 1/1951 | Thompson . |
| 2,537,119 | 1/1951 | Bauerlein . |
| 2,565,084 | 8/1951 | Parks . |
| 2,566,436 | 9/1951 | Waite . |
| 2,573,888 | 11/1951 | Benjamin . |
| 2,585,172 | 2/1952 | Reynolds . |
| 2,588,217 | 3/1952 | DeMille . |
| 2,698,703 | 1/1955 | Harvey . |
| 2,731,906 | 1/1956 | King . |
| 2,736,466 | 2/1956 | Rodth . |

(List continued on next page.)

*Primary Examiner*—Michael S. Huppert
*Assistant Examiner*—Gregory L. Huson
*Attorney, Agent, or Firm*—Workman, Nydegger & Jensen

[57] ABSTRACT

A fluid-driven proportioning pump for dispensing precise volumes of at least three different fluids includes a drive cylinder housing a correspondingly formed drive piston which divides the drive cylinder into first and second drive fluid chambers and is propelled in a reciprocating motion by a pressurized drive fluid. Each face of the drive piston is provided with projecting porportioning pistons which extend into proportioning cylinders that open into each drive fluid chamber and being directed toward the drive piston. An over-center mechanis triggered by movement of the drive piston at the extremes of the strokes for its reciprocating motion operates valving which admits the pressurized drive fluid into alternate of the drive fluid chambers. The over-center mechanism is activated by loop springs or preferably by pairs of C-shaped springs, and is housed entirely within the drive cylinder. Selective adjustment of the proportion among the drive fluid and the other constituent fluids is facilitated by configuring each proportioning piston as a disk-like piston head slidably mounted on a turnable shaft that projects from the face of the drive piston with an enlarged head on the side of the disk remote from the drive piston. The head of the turnable shaft is provided with a fitting that is manipulatable from the outside of the pump by a retractable tool.

59 Claims, 5 Drawing Sheets

U.S. PATENT DOCUMENTS

| | | |
|---|---|---|
| 2,770,394 | 11/1956 | Mueller . |
| 2,808,815 | 10/1957 | Cromwell ........................ 91/346 X |
| 2,894,377 | 7/1959 | Shikles, Jr. et al. . |
| 3,011,681 | 12/1961 | Kromer . |
| 3,047,021 | 7/1962 | Turak . |
| 3,058,620 | 10/1962 | Kromer . |
| 3,259,273 | 7/1966 | Kromer . |
| 3,263,864 | 8/1966 | Welty et al. . |
| 3,310,203 | 3/1967 | McCann . |
| 3,317,084 | 5/1967 | Welty . |
| 3,322,305 | 5/1967 | Tremolada ............................ 222/61 |
| 3,348,737 | 10/1967 | Yingst et al. . |
| 3,357,598 | 12/1967 | Kraft ................................ 222/134 |
| 3,366,276 | 1/1968 | Fridley ................................ 222/51 |
| 3,503,540 | 3/1970 | Fuerst ................................ 222/129.1 |
| 3,589,569 | 6/1971 | Bonetti ............................... 222/250 |
| 3,591,051 | 7/1971 | Mitchell et al. ...................... 222/56 |
| 3,640,433 | 2/1972 | Rodth ................................. 111/129 |
| 3,643,688 | 2/1972 | Meinert ............................... 137/556 |
| 3,650,434 | 3/1972 | Johnson et al. ....................... 222/31 |
| 3,664,550 | 5/1972 | Carothers . |
| 3,717,284 | 2/1973 | Gerrard . |
| 3,727,844 | 4/1973 | Bencic . |
| 3,756,456 | 9/1973 | Georgi ................................ 222/1 |
| 3,756,473 | 9/1973 | Donahue, Jr. ....................... 223/129.2 |
| 3,776,665 | 12/1973 | Dalton ............................... 417/397 X |
| 3,799,402 | 3/1974 | Meister . |
| 3,935,971 | 2/1976 | Papoff et al. . |
| 3,940,019 | 2/1976 | Kross et al. ........................ 222/30 |
| 3,945,536 | 3/1976 | Doak ................................. 222/148 |
| 3,948,419 | 4/1976 | Polster .............................. 222/61 |
| 3,981,414 | 9/1976 | Gust et al. ......................... 222/38 |
| 3,991,219 | 11/1976 | Kuckens . |
| 4,032,040 | 6/1977 | Kecskemethy et al. ................ 222/1 |
| 4,104,008 | 8/1978 | Hoffmann et al. ................... 417/397 |
| 4,121,507 | 10/1978 | Kuckens . |
| 4,180,090 | 12/1979 | Bemba ............................... 137/119 |
| 4,194,650 | 4/1980 | Nottke et al. ...................... 222/57 |
| 4,349,130 | 9/1982 | Bair ................................. 222/129 |
| 4,350,503 | 9/1982 | Skoli et al. . |
| 4,390,035 | 6/1983 | Hill ................................. 222/132 X |
| 4,392,508 | 7/1983 | Switall ............................. 222/132 X |
| 4,411,601 | 10/1983 | Hersom et al. . |
| 4,411,601 | 10/1983 | Hersom et al. . |
| 4,467,941 | 8/1984 | Du . |
| 4,479,758 | 10/1974 | Hersom et al. ..................... 417/508 |
| 4,582,226 | 4/1986 | Doak . |
| 4,599,239 | 7/1986 | Wieland et al. . |
| 4,659,294 | 4/1987 | Barthomeuf ........................ 417/397 |
| 4,708,266 | 11/1987 | Rudick ............................. 222/105 |
| 4,726,483 | 2/1988 | Wallace et al. .................... 222/129 |
| 4,726,493 | 2/1988 | Wallace et al. .................... 222/129 |
| 4,753,370 | 6/1988 | Rudick ............................. 222/132 X |
| 4,779,761 | 10/1988 | Rudick et al. ..................... 222/129.2 X |
| 4,780,064 | 10/1988 | Olsen .............................. 417/397 |
| 4,827,832 | 5/1989 | Hartley et al. .................... 91/346 X |

METHODS AND APPARATUS FOR DISPENSING PLURAL FLUIDS IN A PRECISE PROPORTION

RELATED APPLICATIONS

This is a continuation application of U.S. Pat. application Ser. No. 332,230 filed Mar. 31, 1989 and now abandoned.

BACKGROUND OF INVENTION

1. Field of the Invention

This invention relates to devices for dispensing a plurality of fluids in a precise ratio to each other. More particularly, the invention disclosed herein relates to an improved fluid-driven liquid proportioning pump that effects the positive displacement of the fluids involved. While adaptable to a number of diverse uses, the methods and apparatus of the present invention have ready applicability in the field of mixing and dispensing carbonated beverages.

2. Background Art

Many aspects of industrial processing and consumer merchandising require the continuous, precise dispensing and mixing of a plurality of constituent fluids into a desired product. This is the case in the manufacture of paints, pesticides, fertilizers, and industrial sealants, as well as in the preparation of foods and pharmaceutical, such as margarine, syrups, medicines, toothpaste, and cosmetic preparations In the retial area the dispensing of individual constituent fluids for mixture into a final consumable product is prominent in relation to the retailing of carbonated and other syrup-based beverages and juices.

While the methods and apparatus of the present invention finds utility in each of the above-named and other fields, an immediate application of the present invention resides in meeting the demand in the carbonated beverage industry for an improved manner by which the constituent fluids of such beverages may be dispensed and mixed into a consumer product having narrow specifications that are dictated by desired product taste.

In the production of carbonated beverages, such as cola-type beverages, orange drinks, lemonade drinks, and the like, aromatic flavoring agents in liquid form, such as syrups and concentrates, are metered and combined with predetermined quantities of carbonated water. Typically, the carbonated water is pressurized and mixed with the syrups to form a finished beverage that may be dispensed either into reusable or disposable containers.

This process of dispensing and blending into a final mixture the proper quantities of each fluid in a manner capable of satisfying the sensitized tastes of the consuming public has been rendered moire complicated in recent years by two developments. Firstly, the public preference for artificially sweetened carbonated beverages has increased dramatically. Secondly, the perceived necessity to replace the artificial sweetener saccharin with another has resulted in a widespread shift by the foods industry to use of the artificial sweetener, aspertaime, commonly marketed under the trademark NUTRASWEET ®. Unfortunately, aspertaime has a relatively short shelf-life, after which the flavor of the sweetener undergoes markedly noticeable alteration.

This fact about aspertaime has lead to the practice in the soft drink industry of separating the sweetening element from the aromatic syrups, so that the turnover of sweetener supplies can be accelerated. Accordingly, in dispensing and blending the components of a carbonated beverage that is to contain aspertaime, it is now necessary to blend, not merely two different constituent fluids, but three: carbonated water, an aromatic syrup, and sweetener.

The effort to develop fluid proportioning devices suitable for metering more than two constituent fluids only cast in a harsher light the drawbacks of the devices previously developed toward the dispensing of two constituent fluids. Prior devices were complicated, requiring plural conduits, complex valving, and forms of involved linkages for effecting coordination between the operation of otherwise independent dispensing mechanisms. DEvices which fail to physically integrate the dispensing mechanisms necessitated the use of additional mechanical systems for coordinating the necessarily separate dispensing functions. This added to the complexity of dispensing devices, resulting in a need for require increased maintenance. The resort to electrical drive motors to overcome the need for motive power only complicated the proportioning pumps by adding thereto another system needing its own separate maintenance and isolation for safety and operational purposes.

Many proportioning pumps were reciprocating in nature, but were successful in dispensing constituent fluids in one direction of their reciprocating motion. This produced uneven flow and irregular ratios of the constituent fluids involved in each cycle of operation.

The actual proportioning aspect of such devices presented several problems. Many simply were not accurate, so that a user was faced with unreliability in preparing a final product. The proportioning function was frequently effected by valving external to the mechanism by which constituent fluids were actually advanced through the system. Such external valving itself comprised a separate system of mechanical operation requiring its own maintenance and coordination.

In many instances the proportioning ratio of a given device was either fixed, or if not fixed, was extremely difficult to alter, requiring in most instances disassembly and reassembly in a trial-by-error method. The effort to integrate such proportioning mechanisms resulted in some devices having the proportioning aspects built into the heads of the pistons that are used to advance the constituent fluids. In this location, any alteration of the proportioning ratio was at best difficult to achieve without suffering the expense of substantial down time.

A significant problem in prior proportioning pumps was that the plurality of fluids involved necessitated the incorporation into the proportioning device of a number of dynamic seals. In many cases, of necessity, one or more of these seals was exposed on one side to the atmosphere, tending to age it rapidly due to drying. The concomitant need for replacement and repair of such components is readily predictable.

Ultimately, prior fluid proportioning pumps were complicated assemblages of separate mechanical systems. Each separate component systems required its own maintenance. Intervening systems were necessary for effecting coordinated operations. In the effort to streamline such devices, designers were faced with two conflicting tendencies. Either the subsystems ancillary to that used to advance constituent fluids would be located external to the advancement system, where they would be relatively easily accessible for maintenance and adjustment purposes but relatively difficult to coordinate in any simple manner, or such subsystems could be integrated into the mechanical structure of the fluid advancement subsystem rendered them difficult to access, while possibly more easy to coordinate.

All such drawbacks existed in proportioning pumps used with just two constituent fluids. The need for proportioning pumps which could effectively dispense more than two fluids exacerbated known problems. Additional constituent fluids required additional subsystems for coordination and proportioning. Devices grew more complex, rather than simpler, as would have been desired. No method or apparatus was available which both coped effectively with additional constituent fluids and simplified the number of subsystems and components involved.

BRIEF SUMMARY OF THE INVENTION

One object of the present invention is to provide methods and apparatus for simultaneously dispensing precisely measured quantities of three or more different constituent fluids.

Another object cf the present invention is to provide a fluid proportioning apparatus which effects the positive displacement of the constituent fluids involved, but which does so with a consistent precision of operation acceptable in the industry in which it is applied.

Yet another object of the present invention is a fluid proportioning apparatus and method as described above which is driven exclusively by the pressure exerted by one of the constituent fluids being processed.

An additional object of the invention is a method and apparatus for proportioning fluids as described above which utilizes reciprocating motion and which is capable of continuously dispensing the constituent fluids involved.

Another object of the invention is an apparatus for proportioning fluids in which the dynamic seals thereof avoid exposure to the atmosphere, and therefore enjoy effective lifetimes of enhanced duration.

Another object of the present invention is a fluid proportioning pump as described above in which the proportioning aspect thereof is adjustable, and further is adjustable without requiring major disassembly of the device.

Yet another object of the present invention is a fluid proportioning pump for three or more fluids which is mechanically streamlined in relation to prior proportioning pumps so as to be compact, easily assemblable, and minimally demanding of maintenance.

Additional objects and advantages of the invention will be set forth in the description which follows, and in part will be obvious from the description, or may be learned by the practice of the invention. The objects and advantages of the invention may be realized and obtained by means of the instruments and combinations particularly pointed out in the appended claims.

To achieve the foregoing objects and in accordance with the invention as embodied and broadly described herein, a fluid-driven proportioning pump is provided for dispensing in a precise, predetermined ratio quantities of an externally pressurized drive fluid and a first and a second constituent fluid. In one embodiment of the present invention, such a proportioning pump comprises a drive cylinder having closed ends and a drive piston disposed therein. The drive piston is propelled by the drive fluid in a reciprocating motion comprising successive strokes in opposite directions. The drive piston in effect separates the drive cylinder into a first and a second drive fluid chamber.

The inventive proportioning pump further comprises a drive reversal means for admitting the pressurized drive fluid alternately into the first and the second drive fluid chambers to cause the reciprocating motion in the drive piston. In that motion drive fluid is positively displaced from the one of the first and second drive fluid chambers into which the pressurized drive fluid is not at the time being admitted.

In a preferred embodiment of the inventive proportioning pump, the drive reversal means comprises a pressurized drive fluid passageway and a drive fluid exit passageway formed in each of a pair of plate assemblies closing the opposite ends of the drive cylinder. First and second valve means are provided for placing the first and second drive fluid chambers respectively, in communication alternately with the pressurized drive fluid passageway and the drive fluid exit passageway in the adjacent plate assembly. A linkage means for operating the first and second valve means together insures that when one of the drive fluid chambers is in communication with a drive fluid passageway, the other is in communication with a drive fluid exit passageway. In this manner, the pressure of the drive fluid in one of the drive fluid chambers advances the drive piston in the direction of the other drive fluid chamber, positively displacing drive fluid from the preceding opposite stroke of the reciprocating motion of the drive piston.

An over-center means in turn drives the linkage means between a first operative mode, in which the first drive fluid chamber is in communication with a pressurized drive fluid passageway, and a second operative mode, in which the second drive fluid chamber is in communication with a pressurized drive fluid passageway. The over-center means functions in this manner responsive to the completion of each successive stroke of the reciprocal motion of the drive piston.

In one embodiment of the present invention, the overcenter means is located entirely within the drive cylinder and comprises a pair of resilient springs located on opposite sides of the drive piston, each being compressed between a linkage bearing surface rigidly attached to the linkage means and a drive bearing surface rigidly attached to the drive piston.

The proportioning aspect of the inventive proportioning pump resides in a pair of proportioning cylinders for each of the constituent fluids involved. One proportioning cylinder for each of the constituent fluids opens opposite the drive piston into each of the first and second drive fluid chambers. Although other arrangements are conceivable and within the scope of the present invention, it is contemplated in the presently preferred embodiment of the inventive proportioning pump that the axis of each of the proportioning cylinders be parallel to the axis of the drive cylinder. To each proportioning cylinder corresponds a single constituent fluid passageway through which the constituent fluid corresponding therefor is admitted into and positively displaced from the proportioning cylinder.

From each face of the drive piston extend a pair of proportioning pistons that are disposed in corresponding individual proportioning cylinders. By this arrangement, the reciprocating motion of the drive cylinder simultaneously advances and retracts the constituent fluid proportioning pistons within their corresponding proportioning cylinders. This in turn alternately draws into those cylinders, and on the following reverse stroke positive displaces therefrom, precisely measured quantities of constituent fluid. Simultaneously, drive fluid is displaced from the drive fluid chamber not receiving drive fluid in a pressurized state, and a measured displacement of the drive fluid and each of the constituent fluids results.

In one aspect of the present invention, the proportioning pump is provided with a ratio adjustment means for selectively varying the quantity of at least one of the constituent fluids that is drawn into and displaced from one of the proportioning cylinders. Referring to such a proportioning cylinder as a meterable proportioning cylinder, this is effected through a proportioning piston head in the metering proportioning cylinder in combination with and means to permit waste movement of the drive cylinder relative to the proportioning piston head in each direction of the reciprocating motion of the drive cylinder.

In one embodiment of the present invention, the means to permit waste movement comprises a footing projecting from the drive cylinder toward the metering cylinder and a proportioning piston shaft extending from the footing. The piston shaft slidably passes through the proportioning piston head into the meterable proportioning cylinder. A radially enlarged retaining head is provided on the end of proportioning piston shaft within the meterable proportioning cylinder. In each stroke of the drive piston, waste movement occurs as the proportioning piston slides the length of the piston shaft between the retaining head and the footing.

Means are provided for selectively varying the extent of the waste movement involved. Cooperating threading secures the proportioning piston shaft to the footing, and an internal adjustment fitting on the retaining head permits the retaining head to be rotated to change the distance between the retaining head and the footing. This varies the amount of waste movement permitted in each stroke of the proportioning pump. An external access means cooperates to enable the selective rotating of the internal adjustment fitting from the exterior of the proportioning pump.

In one embodiment of the present invention, the external access means comprises an adjustment opening formed through the end of the meterable proportioning cylinder opposite the proportioning piston head, and an adjusting rod slidably and rotatably mounted in the adjusting opening. The end of the adjusting rod interior to the proportioning cylinder includes an adjustment transfer tool for mating with the internal adjustment fitting. The other end of the adjusting rod is provided with an external adjustment fitting by which the adjustment rod may be rotated. by selective advancement of the adjusting rod into the proportioning cylinder, the adjustment transfer tool can be made to engage the internal adjustment fitting. Then rotation of the adjusting rod with the external adjustment fitting will also rotate the proportioning piston shaft from the exterior of the proportioning cylinder.

In an alternative characterization, a proportioning pump is provided for dispensing in a precise, predetermined ratio quantities of a first and a second fluid. The portioning pump comprises reciprocating means for continuously dispensing the first fluid. The reciprocating means includes a stationary portion enclosing opposed first and second fluid chambers and an active portion housed within the stationary portion. The active portion is driven in a reciprocating motion comprises successive strokes in opposite directions alternately towards the first and towards the second fluid chambers. The proportioning pump further comprises first and second reservoir means for holding a predetermined quantity of the second fluid. These are located individually in said first and second fluid chambers, respectively. Fluid advancement means operably connected to the active portion of the reciprocating means are provided for continuously dispensing the second fluid. The fluid advancement means draws a predetermined quantity of the second fluid into one of the reservoir means and positively displaces the predetermined quantity of the second fluid from the other of the reservoir means in the stroke of the motion of the reciprocating means.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only be considered limiting of its scope, the invention will be described with additional specificity and detail through the use of the accompanying drawings, in which:

FIG. 5 is an exploded disassembled perspective view of a second embodiment cf an over-center mechanism for use with the proportioning pump of FIG. 1.

DESCRIPTION OF THE PREFERRED EMBODIMENTS

Figure 1:
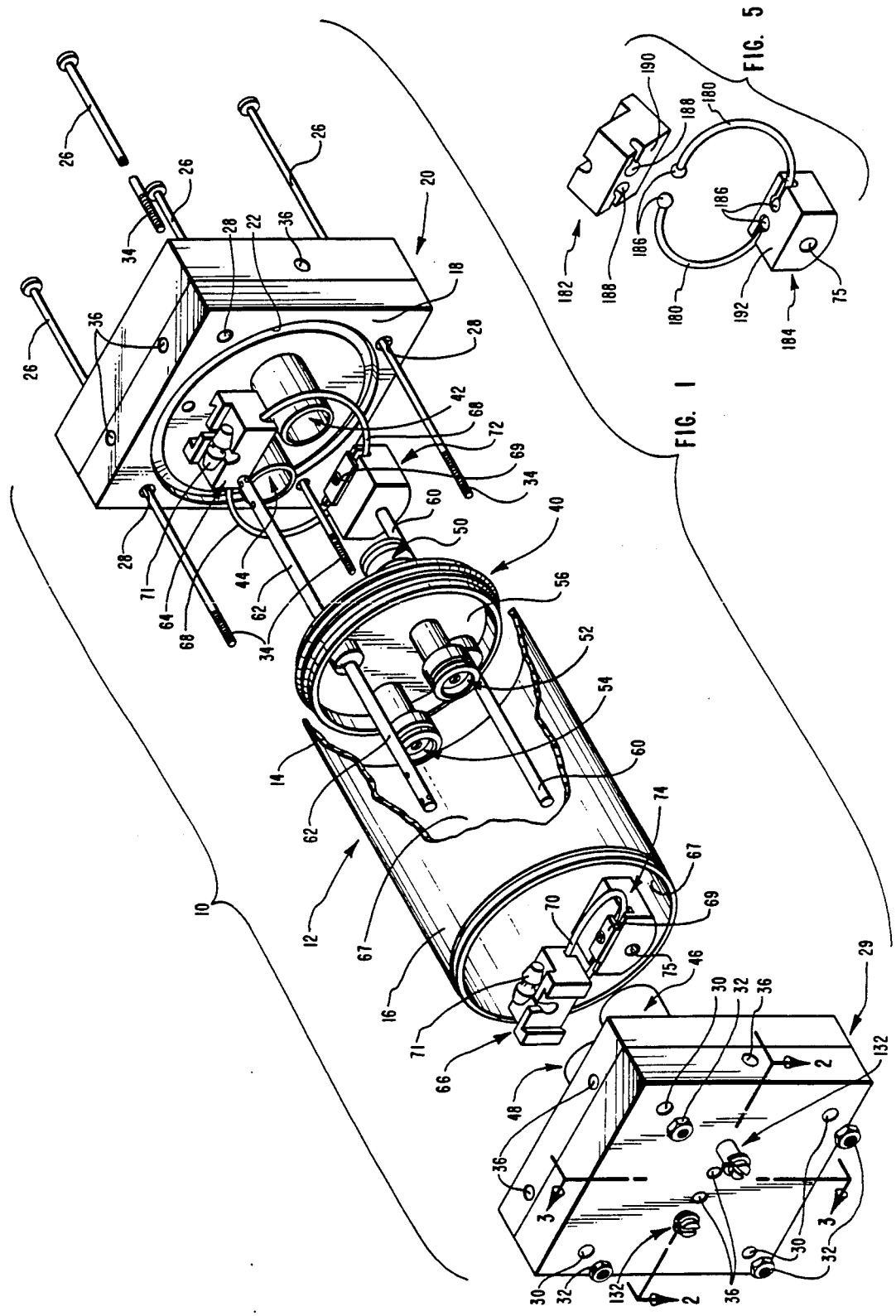
FIG. 1 is an exploded perspective view of one embodiment of a fluid proportioning pump incorporating the teachings of the present invention.

An overview of the main structural features of an embodiment of a liquid proportioning pump incorporating teachings of the present invention can be derived by reference to FIG. 1. There, a liquid proportioning pump 10 is shown in a disassembled condition as including a drive cylinder 12 having first and second ends 14, 16, respectively. In the assembled condition of proportioning pump 1-, first end 14 of drive cylinder 12 abuts against an inner face 18 of a first plate assembly 20. To assist in effecting a secure seal, inner face 18 is provided with an annular recess 22 which receives an O-ring not shown in FIG. 1, and first end 14 of drive cylinder 12. Correspondingly, in the assembled condition of proportioning pump 10, a second plate assembly 24 closes drive cylinder 12 by abutment against end 16 thereof. This state of assembly is maintained by four elongated assembly bolts 26 which pass through eyes 28 in first plate assembly 20 and thereafter through eyes 30 in second plate assembly 24. Nuts 32 are then threaded onto leading ends 34 of assembly bolts 26 to draw first plate assembly 20 and second plate assembly 24 against the opposite ends of drive cylinder 12.

Formed in first and second plate assemblies 20, 24, respectively, but not visible in FIG. 1, are a plurality of passageways for the constituent fluids to be dispensed by proportioning pump 10. These fluids enter the passageways referred to through openings identified generally in FIG. 1 by reference character 36. Typically, openings 36 are provided with fittings by which to connect to proportioning pump 10 tubes bringing the constituent fluids to proportioning pump 10 from reservoirs or container thereof, as well as tubes conveying away metered quantities of the same. For the benefit of simplicity, such fittings and tubing have been omitted from FIG. 1 and all subsequent figures of this disclosure, as it is readily within the capacity of those skilled in the art to effect the required fluid connections for proportioning pump 10.

Aside from the tubes and constituent fluid sources discussed above, all other operating components of proportioning pump 10 are located interior to first and second plate assemblies 20, 24, respectively, or within drive cylinder 12. Such additional components will be identified briefly by reference to FIG. 1, but discussed subsequently in more detail and interrelated with the other components of proportionate pump 10.

A drive piston 40 is disposed in drive cylinder 12 and propelled in a reciprocating motion of successive strokes in opposite directions by the pressurized drive fluid. The details of the structure of a preferred embodiment of a drive piston, such as drive piston 40, for use in proportioning pump 10 will be discussed subsequently in relation to FIG. 4. Nevertheless, alternative forms of such a drive piston could easily be accommodated within the limitation and teachings of the present invention. It is important to note that while the cross-section of drive cylinder 12 as shown in FIG. 1 is circular and while the cross-section of drive piston 40 corresponds thereto, it would be equally workable, although not presently preferable, to employ a drive cylinder in proportioning pump 10 that has virtually any workable prismatic cross-section. Thus, a drive cylinder such as drive cylinder 12, could be elliptical, rectangular, or of any other workable cross-section, provided that the size and shape of the drive piston to function therewith is modified accordingly from that shown for drive piston 40 in FIG. 1.

Other structural elements of proportioning pump 10 which in the assembled state thereof are contained within drive cylinder 12 include a pair of proportioning cylinders 42, 44 projecting into drive cylinder 12 from inner face 18 of first plate assembly 20. Similarly, but less clearly shown in FIG. 1, proportioning cylinders 46, 48 project from second plate assembly 24, also into drive cylinder 12. The ends of proportioning cylinders 42, 44, 46, 48 oriented toward drive piston 40 are open.

Generally, the longitudinal axis of the proportioning cylinders are parallel to the longitudinal axis of drive cylinder 12, although this need not absolutely be the case within the scope of the present invention. One of the two proportioning cylinders on each of first plate assembly 20 and second plate assembly 24 corresponds to the first of the constituent fluids, other than the drive fluid, that is to be dispensed in a predetermined quantity by proportioning pump 10. The other proportioning cylinder on each of first and second plate assemblies 20, 24, respectively, corresponds to the second of the constituent fluids. The constituent fluid for each proportioning cylinder enters and exits through passageways in the respective plate assembly from which each proportioning cylinder projects. These passageways terminate in openings on the exterior of the plate assemblies, such as openings 36.

Constituent fluid is drawn into each proportioning cylinder and positively displaced therefrom by a proportioning piston which projects from the face of drive piston 40 opposite thereto. The proportioning pistons move backwards and forwards in each respective proportioning cylinder with drive piston 40 in the reciprocating motion in which it is propelled by the drive fluid. Specifically, when proportioning pump 1- is assembled, a proportioning piston 50 extending from the face of drive piston 40 not visible in FIG. 1 is received in proportioning cylinder 42, whereby reciprocating motion of drive piston 40 alternately advances and retracts proportioning piston 50 within proportioning cylinder 42 to correspondingly draw thereinto and to positively displace therefrom precisely measured quantities of the constituent fluid corresponding thereto. In a similar manner, a proportioning piston 52 and a proportioning piston 54 projecting from the side 56 of drive piston 40 visible in FIG. 1 extend into proportioning cylinders 46, 48, respectively, when proportioning pump 10 is assembled. The operation of proportioning pistons 52, 54 within their respective proportioning cylinders is reversed with respect to that of proportioning piston 50 described above. Thus, when a stroke if drive piston 40 is advancing proportioning piston 50 into proportioning cylinder 42 to positively displace the constituent fluid therefrom, proportioning pistons 52, 54 are simultaneously being retracted within proportioning cylinders 46, 48, respectively, to draw thereinto the constituent fluid. A fourth proportioning piston not visible in FIG. 1 but appearing hereafter in various figures of this disclosure will be identified by the reference character 58. This proportioning piston extends from the side of drive piston 40 not visible in FIG. 1 into proportioning cylinder 44 when proportioning pump 10 is assembled.

In its reciprocating motion within drive cylinder 12, drive piston 40 is stabilized by means of a guide shaft 60 which slidably passes through drive piston 40 and has each end thereof secured in one of first plate assembly 20 and second plate assembly 24. Drive piston 40 is also guided by a shaft 62 which also slidably passes through drive piton 40 and is secured from lateral, although not longitudinal, motion at its opposite ends in first plate assembly 20 and second plate assembly 24. Shaft 62 plays an integral role in the valving of the pressurized drive fluid into drive cylinder 12 alternately on opposite sides of drive piston 40 so as to induce a reciprocating motion therein. This role will be explored in close detail presently.

Before leaving FIG. 1, it will be useful to point out further structural components of proportioning pump 10 which are housed within drive cylinder 12 when proportioning pump 10 is assembled. These additional elements include first and second valve blocks 64, 66, respectively, which in the assembled state of proportioning pump 10 are rigidly secured to valving shaft 62 near the remote ends thereof. Between the inner surface 67 of drive cylinder 12 and each of first and second valve blocks 64, 66, respectively, is interposed a roller bearing 71 that facilitates the free lateral movement of valving shaft 62 with first valving block 64 and second valving block 66, attached thereto.

This lateral movement partially effected as a result of a first and a second spring 68, 70, respectively, which can satisfactorily take many forms. As shown in FIG. 1 for illustrative purposes, first and second springs 68, 70, respectively, comprise resilient loops, which may be discontinuous at one point in the circumferences thereof having free ends that facilitate the resiliency desired. First spring 68 is held in compression between first valve block 64 and a first spring shoe 72 which in the assembled condition of proportioning pump 22 is slidably mounted on guide shaft 60 and rigidly attached to the side of drive piston 40 not visible in FIG. 1. Correspondingly, second spring 70 is held in compression between second valve block 66 and a second spring shoe 74 which similarly is slidably mounted on guide shaft 60 and rigidly secured to side 56 of drive piston 40. Guide shaft 60 passes through a bore 75 formed in spring shoe 74. The free ends of the loops of first and second springs 68, 70, respectively, are covered and clamped to first and second spring shoes 72, 74, respectively, and covered by spring clamp plates 69. The manner in which the structures just described interact mechanically with valving shaft 62 to effect a valving function will appear presently.

An additional fact about the relative positioning of the components of proportioning pump 10 is best appreciated by reference to FIG. 1 and deserves mention at this time. First and second springs 68, 70, respectively, are so configured and so positioned by the locations of the valve block and shoe spring between which each is constrained that when first and second plate assemblies 20, 24, respectively, are in place against drive cylinder 12, first spring 68 encircles proportioning cylinders 42 and 44 together in the space between those proportioning cylinders and inner surface 67 of drive cylinder 12. Similarly, second spring 70 encircles proportioning cylinders 46 and 48 together in the space between those proportioning cylinders and inner surface 67 of drive cylinder 12.

In the operation of proportioning pump 10, a pressurized drive fluid is valved into drive cylinder 12 alternately on opposite sides of drive piston 40 in a manner yet to be fully disclosed. This valving of the pressurized drive fluid sets drive piston 40 into a reciprocating motion in which drive fluid on the side of drive piston 40 that is no longer pressurized is vented, and the drive motion of drive piston 40 positively displaced that nonpressurized drive fluid therefrom. On the return stroke, the previously vented side of drive piston 40 is made to communicate with the drive fluid in a pressurized state, while the drive fluid on the opposite side of drive piston 50, which was previously pressurized, is vented and begins to be positively displaced from drive cylinder 12 by the reversed movement by drive piston 40.

In the process described, proportioning pistons 50, 52, 54, and 58 (the latter not shown in FIG. 1) alternately advance and retract within their corresponding proportioning cylinders due to their attachment to drive piston 40. The pair of proportioning pistons oriented in the direction of each stroke of drive piston 40 move into the proportioning cylinders corresponding thereto, positively displacing a predetermined volume of constituent fluid from each. The pair of proportioning pistons oriented counter to the motion on the opposite side of drive piston 40, are retracted within their corresponding proportioning piston on the same stroke. This draws constituent fluid thereinto. When the motion of drive piston 40 is reversed, the proportioning pistons reverse their functions as well.

In each stroke of drive piston 40, predetermined quantities of drive fluid and a first and a second constituent fluid are positively displaced for mixing outside of proportioning pump 10 to form a desired final product. In general the extent of travel both of drive piston 40 and of the proportioning pistons attached thereto are equal, the ratio of the fluids displaced thereby corresponds approximately to the ratio of the areas of each of the piston heads involved. Thus, the sizes of drive cylinder 12 in relation to each of the proportioning cylinders utilized will in a relatively permanent sense determine the ratio with which drive fluid and each of the constituent fluids is displaced.

Thus, in one manner of characterizing the present invention, an apparatus is provided for dispensing in a precise, predetermined ratio quantities of a first and a second fluid. The apparatus includes reciprocating means for continuously dispensing the first fluid. As shown by way of example in FIG. 1 the reciprocating means comprises a stationary portion, including drive cylinder 12, first plate assembly 20, and second plate assembly 24, and an active portion housed therewithin. The active portion includes drive piston 40 and valving shaft 62 is driven in a reciprocating motion comprising successive strokes in opposite directions alternately toward first end plate 20 and second end plate 24.

Alternative forms of a reciprocating means, such as a suitably configured diaphragm pump, are workable and contemplated as within the scope of the present invention. While it is presently preferable that the active portion of the reciprocating means be fluid driven, the use of alternative motive sources, such as motors and engines, while foregoing some advantages of the present invention, is still contemplated as being within the scope thereof.

Also provided in the inventive apparatus are first and second reservoir means for holding a predetermined quantity of the second fluid. Each is located individually within drive cylinder 12 on opposite sides of drive piston 40. As shown by way of example in FIG. 1, proportioning cylinders 42, 44 project into drive cylinder 12 from first plate assembly 20, while proportioning cylinders 46, 48 project from second plate assembly 24 into drive cylinder 12.

Finally, the apparatus of the present invention according to this manner of characterization includes a fluid advancement means that is operably connected to drive piston 40 for continuously dispensing the second fluid. As shown in FIG. 1 by way of example and not limitation, proportioning pistons 52, 54 project from side 56 of drive piston 40 and extend into proportioning cylinders 46, 48, respectively. Correspondingly, proportioning piston 50 and proportioning piston 58, not shown in FIG. 1, project from the opposite side cf drive piston 40 into proportioning cylinders 42, 44, respectively. Accordingly, during each stroke of the reciprocating motion of piston 40 the reciprocating means thus disclosed draws a predetermined quantity of the second fluid into the proportioning cylinders on one side of drive piston 40 while displacing a predetermined quantity of the second fluid from the proportioning cylinders ont the opposite side of drive piston 40.

As used herein, and in the claims hereafter, the use of the term "continuously" in relation to the advancement of any fluid by reciprocating components of the present invention refers both to a discharge of fluid which occurs at each moment during operation, as well as the discharge of at least some of the fluid during each successive stroke of the reciprocating motion. Thus, if either of proportioning pistons 50, 52 displaces at least some of the second fluid during each stroke of drive piston 40 toward second plate assembly 24 and either of proportioning pistons 50, 58 displaces at least some of the same second fluid in each stroke of drive piston 40 in the opposite direction toward first plate assembly 20, then the fluid advancement means which comprises the recited proportioning pistons is to be considered to continuously dispense the second fluid. This will be the case even where the second fluid is not dispensed during the entire line of travel of each stroke of drive piston 40.

In one aspect of the present invention, however, ratio adjustment means are provided for selectively varying the quantify of at least one of the constituent fluids drawn into and displaced from the proportioning cylinders corresponding thereto. While in all likelihood it is preferable that all proportioning cylinders in a proportioning pump according to the present invention be provided with such a ratio adjustment means, any proportioning cylinder so provided will herein, and particularly int he claims hereafter, be referred to as a meterable proportioning cylinder to enhance descriptive clarity.

Figure 2:
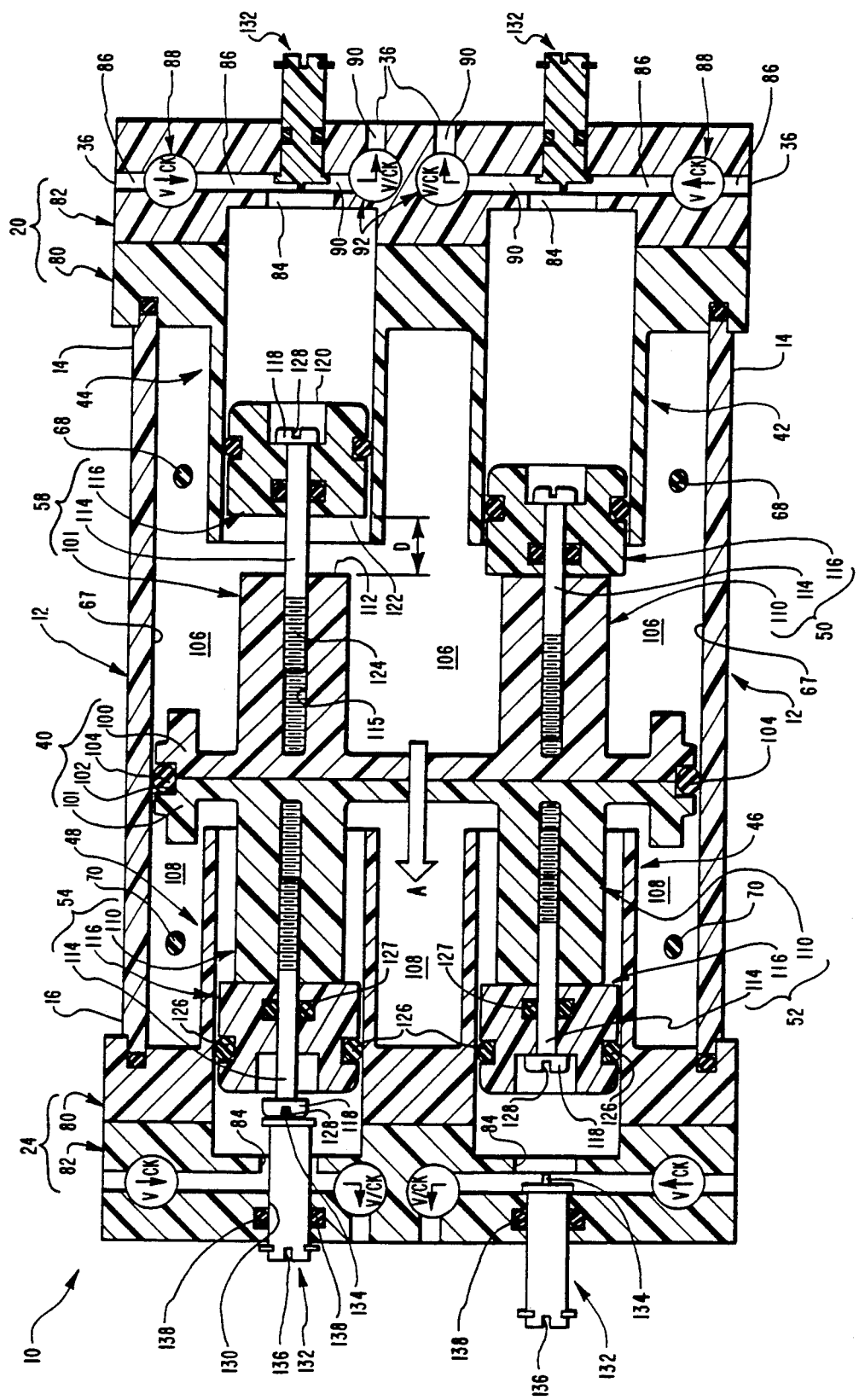
FIG. 2 is a cross-sectional view of the proportioning pump of FIG. 1 in an assembled condition taken along section line 2—2 shown therein.

A typical structure corresponding to such a ratio adjustment means is disclosed in the cross-section shown in FIG. 2, wherein the structures already discussed in relation to FIG. 1 are labeled consistently therewith. The view provided in FIG. 2 reveals firstly that each of first and second plate assemblies 20, 24, respectively, comprise a drive cylinder end plate 80 which actually effects closure of the ends of the drive cylinder 12 by engaging first and second ends 14, 16 thereof and a valve plate 82 on the outside of each drive cylinder end plate 80.

In each valve plate 82 are formed a plurality of constituent fluid passageways 84, one of which communicates with each of proportioning cylinders 42, 44, 46, 48. Each constituent fluid passageway 84 communicates through an intake passageway 86 to one of the openings 36 shown in FIG. 1 on the exterior of each plate assembly. Within each intake passageway 86 is a check valve 88 oriented to permit one-way flow of constituent fluid into each proportioning cylinder. Constituent fluid enters each of the proportioning cylinders by the route of check valve 88, intake passageway 86, and constituent fluid passageway 84.

In addition, constituent fluid passageway 84 is connected through a venting passageway 90 to other of openings 36. Within each venting passageway 90 is a check valve 92 oriented to permit one-way flow of constituent fluid out of each proportioning cylinder. Constituent fluid is displaced from each proportioning cylinder through constituent fluid passageway 84, venting passageway 90, and check valve 92.

Check valves 88 and 92 can be of any type of check valve known in the art capable of insuring an appropriate one-way flow. Umbrella, duck bill, or ball-and-spring check valves are thus suitable in this regard.

Figure 4:
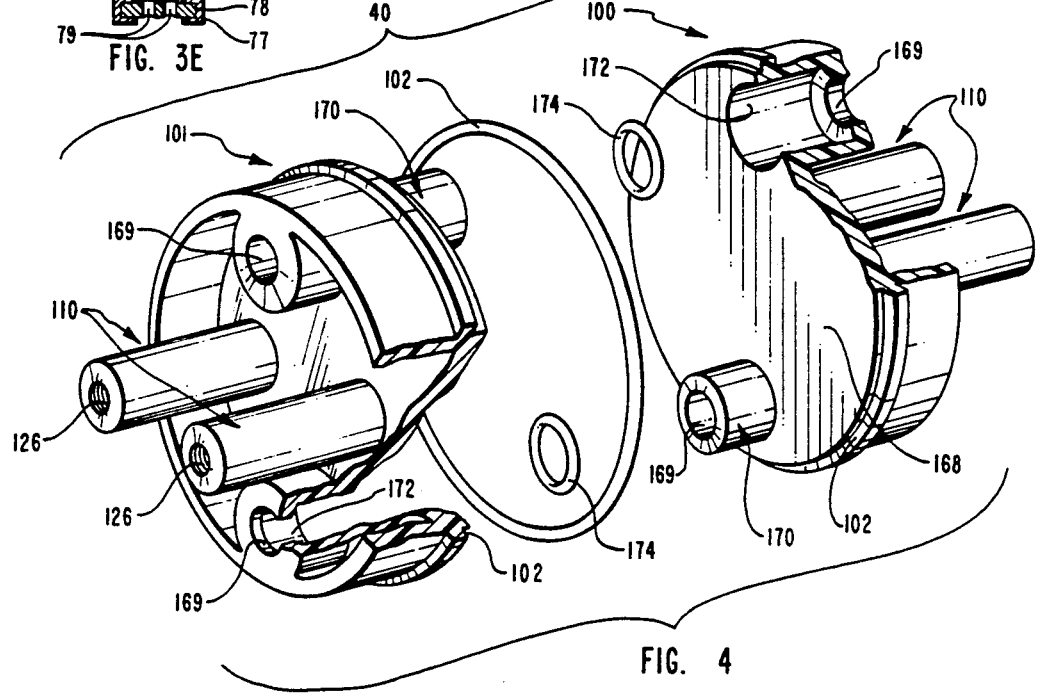
FIG. 4 is an exploded disassembled perspective view of the drive cylinder of the proportioning pump shown in FIG. 1.

FIG. 2 further reveals that drive piston 40 is comprised of a pair of substantially identical drive piston plates 100, shown to better advantage in the perspective view of FIG. 4. Drive piston plates 100 are mated in a back-to-back relationship to form therebetween a circumferential retaining slot 102 in which is disposed a sealing ring 104. Sealing ring 104 engages inner surface 67 of drive cylinder 12 to enable reciprocal sliding of drive piston 40 therewithin. Sealing ring 104 isolates drive cylinder 12 into a first drive fluid chamber 106 on the side of drive piston 40 that contains proportioning cylinders 42, 44, and a second drive fluid chamber 108 on the side of drive piston 40 opposite therefrom that contains proportioning cylinders 46, 48.

As seen in FIG. 2, drive piston 40 has reached the full extent of its movement leftwardly in the direction shown by arrow A, a movement that is induced by placing first drive fluid chamber 106 in oommunication with a drive fluid under pressure. In the process of movement in the direction of arrow A, drive fluid was positively displaced from second drive fluid chamber 108 due to the advancement of drive piston 40.

Although the cross-section of the proportioning cylinders and pistons shown in FIG. 2 are constant, the inventive proportioning pump disclosed herein includes a ratio adjustment means for selectively varying the quantify of at least one of the constituent fluids drawn into and displaced from one of said proportioning cylinders. Any proportioning cylinder provided with this feature will herein, and particularly in eh claims hereafter, be referred to as a meterable proportioning cylinder. Each of the proportioning cylinders 42, 44, 46, and 48 shown in FIG. 2 are meterable in this sense, but for illustrative purposes only one, namely proportioning cylinder 44 with the proportioning piston 58 corresponding thereto, will be discussed and labeled incomplete detail.

Proportioning piston 58 comprises three main elements. First, a footing 110 projects from first drive piston place 100 opposite proportioning cylinder 44. The end of footing 100 remote from drive piston 40 is formed into a flat bearing surface 112 from which a proportioning piston shaft 114 further projects toward proportioning cylinder 44. Proportioning piston shaft 114 is threaded into a bore 115 longitudinally formed at the center of footing 110. The end of proportioning piston shaft 114 remote from footing 110 slidably and rotatably passes through a disc-shaped proportioning piston head 116 to terminate in a radially enlarged retaining head 118.

Proportioning piston head 116 has a front surface 120 oriented toward the interior of proportioning cylinder 44 and a read surface 122 oriented toward drive cylinder 40 and bearing surface 112. The fixed cross-section of proportioning cylinder 44 would, under normal circumstances, determine in a fixed manner the ratio of the constituent fluid positively displaced therefrom in relation to the quantify of drive fluid positively displaced from first drive fluid chamber 106. Nevertheless, the ratio adjustment means of the present invention, which includes proportioning piston head 116, is in turn provided with means to permit waste movement or drive cylinder 40 relative to proportioning piston head 116 in each direction of the reciprocating motion of drive cylinder 40. Footing 110, proportioning piston shaft 114, and retaining head 118 comprise such a means to permit waste movement. In embodiments of the present invention provided with this feature, the rule thus does not apply that the ratio of fluids displaced in each pumping stroke is equal to the ratio of the areas of the piston heads involved.

As drive piston 40 moves in the direction indicated in FIG. 2 by arrow A, proportioning shaft 114 of proportioning piston 58 is also drawn in the direction of arrow A with drive piston 40. Initially, proportioning shaft 114 slides through the corresponding proportioning piston head 116 until retaining head 118 encounter front surface 120 thereof. Thereafter, continued movement of drive piston 40 in the direction of arrow A causes retaining head 118 to pull proportioning piston head 116 in the direction of arrow A thereafter. This draws constituent fluid into proportioning cylinder 44.

When the direction of movement of drive piston 40 is reversed relative to arrow A, proportioning piston shaft 114 of proportioning piston 58 slides through the corresponding proportioning piston head 116 until bearing surface 112 of proportioning piston 58 engages rear surface 122 of corresponding proportioning piston head 116. Thereafter, continued movement of drive piston 40 in the direction opposite that shown by Arrow A will advance proportioning piston head 116 into proportioning cylinder 44. The sliding of proportioning piston shaft 114 relative to proportioning piston head 116 thus results in waste movement of drive piston 40 relative to proportioning piston head 116 on each stroke of the reciprocating movement of drive piston 40. In relation to proportioning piston 58, this waste movement is in an amount illustrated in FIG. 2 by a distance D extending between bearing surface 112 and rear surface 122 of proportioning piston head 116 when retaining head 118 is engaging front surface 120 thereof. The grater the amount of such waste movement, the less constituent fluid will be displaced through proportioning cylinder 44 during each stroke of drive piston 40.

In accordance with another aspect of the present invention, adjustment means are provided to selectively vary the extent of the waste movement undertaken by drive piston 40 in relation to each of the meterable proportioning cylinder of proportioning pump 10. As shown by way of illustration and not limitation, the adjustment means of the present invention comprises threadings 124 on one end of proportioning piston shaft 114. Threadings 124 engage cooperating threadings in bore 115 in footing 110 and secure proportioning piston shaft 114 thereto. In order to effect the required fluid seals, proportioning pistons 52, 54 are shown in FIG. 2 as including O-rings 126 encircling proportioning piston heads 116 and O-rings 127 encircling proportioning piston shafts 114. In addition, retaining head 118 is provided with an internal adjustment fitting 128 by which proportioning piston shaft 114 may be rotated. By way of threadings 124 this varies the distance D, and correspondingly the amount of waste movement, associated with each stroke of drive piston 40.

Rotation of proportioning piston shaft 114 fully into bore 115 will bring rear surface 122 of proportioning piston head 116 into abutment with bearing surface 112. Such a situation is shown in relation to proportioning piston 50 in proportioning cylinder 42. Under such conditions, no waste movement of drive cylinder 40 occurs relative to proportioning piston head 116 of proportioning piston 50, and a maximum predetermined quantity of constituent fluid is displaced from proportioning cylinder 42 on each stroke of drive piston 40.

As shown in relation to proportioning pistons 52, 54 and corresponding proportioning cylinders 46, 48, movement of drive piston 40 in the direction of arrow A has initially advanced proportioning piston shafts 114 through proportioning piston heads 116 of proportioning pistons 52, 54 into the proportioning cylinders corresponding thereto. This continues until such point as bearing surfaces 112 on foots 110 engages rear surfaces 122 of proportioning piston heads 116 in each proportioning piston. During such waste movement no displacement occurs of the second constituent fluid from the proportioning cylinders involved. Thereafter, proportioning piston heads 116 of proportioning pistons 52, 54 are advanced into their respective proportioning cylinders by the movement of drive piston 40. This displaces constituent fluid from the proportioning cylinders 46, 48 at a fixed rate for the balance of the full stroke of drive piston 40. Where this process occurs ont he reverse stroke of drive piston 40 in proportioning cylinders ont eh opposite side of drive piston 40, the displacement of the second constituent fluid is nevertheless herein referred to as being continuous despite any interruptions in the displacement due to waste movement of proportioning piston heads.

In another aspect of the present invention, external access means are provided for selectively rotating internal adjustment fitting 128 from the exterior of proportioning pump 10. As shown by way of example and not limitation, in FIG. 2 in relation to proportioning cylinder 48, an adjustment opening 130 is formed through second plate assembly 24 opposite proportioning cylinder 48. Adjustment opening 130 is in axial alignment with constituent fluid passageway 84. Slidably and rotatably mounted in adjustment opening 130 is an adjustment rod 132 which is provided at the end thereof internal to proportioning pump 10 with an adjustment transfer tool 134 by which to engage internal adjustment fitting 128. Adjustment rod 132 may be selectively advanced into proportioning cylinder 48 to engage internal adjustment filling 128 on proportioning piston shaft 114 therein. The end of adjustment rod 132 opposite from transfer tool 134 is equipped with an external adjustment fitting 136 by which adjustment rod 132 may be rotated by a common tool, such as a screw driver or wrench. When external adjustment fitting 136 is thus rotated, this motion is transferred by transfer tool 134 to proportioning piston shaft 114.

As discussed earlier, rotation of proportioning piston shaft 114 varies the distance D representing waste motion between drive piston 40 and the proportioning piston involved. This in turn affects the quantity of constituent fluid displaced from the corresponding proportioning cylinder on each of the strokes of drive piston 40. In FIG. 2 adjustment rod 132 associated with proportioning piston 54 is shown thusly advanced into the proportioning cylinder 48, and is engaging internal adjustment fitting 128 on retaining head 118 with transfer tool 134. Adjustment rod 132 is sealingly retained in adjustment opening 130 by an O-ring 138.

Proportioning pump 10 accordingly is not only capable of dispensing a drive fluid and at least two constituent fluids in a predetermined proportion, but of permitting the selective adjustment of the predetermined proportion from exterior proportioning pump 10 without the inconvenience of any disassembly whatsoever.

Figure 3A:
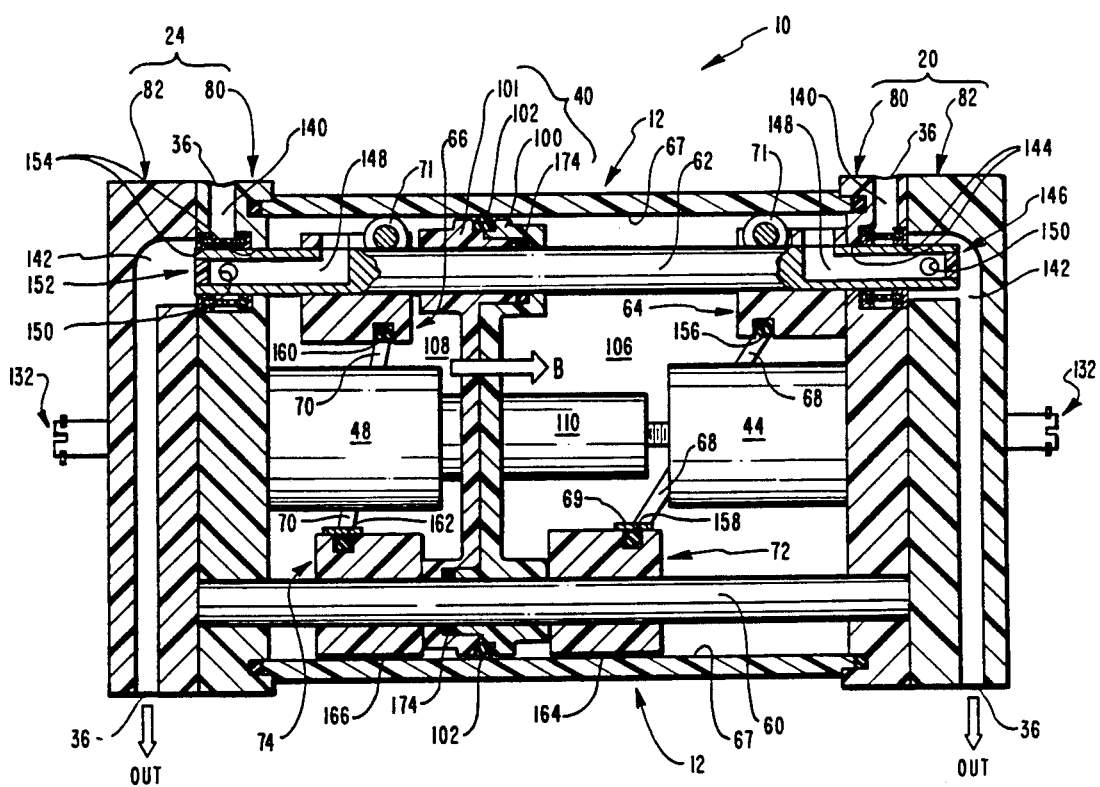
FIG. 3A is a cross-sectional view of the proportioning pump of FIG. 1 in an assembled condition taken along section line 3—3 shown therein and illustrating the relative positions of the components thereof in a first stage of operation.
Figure 3B:
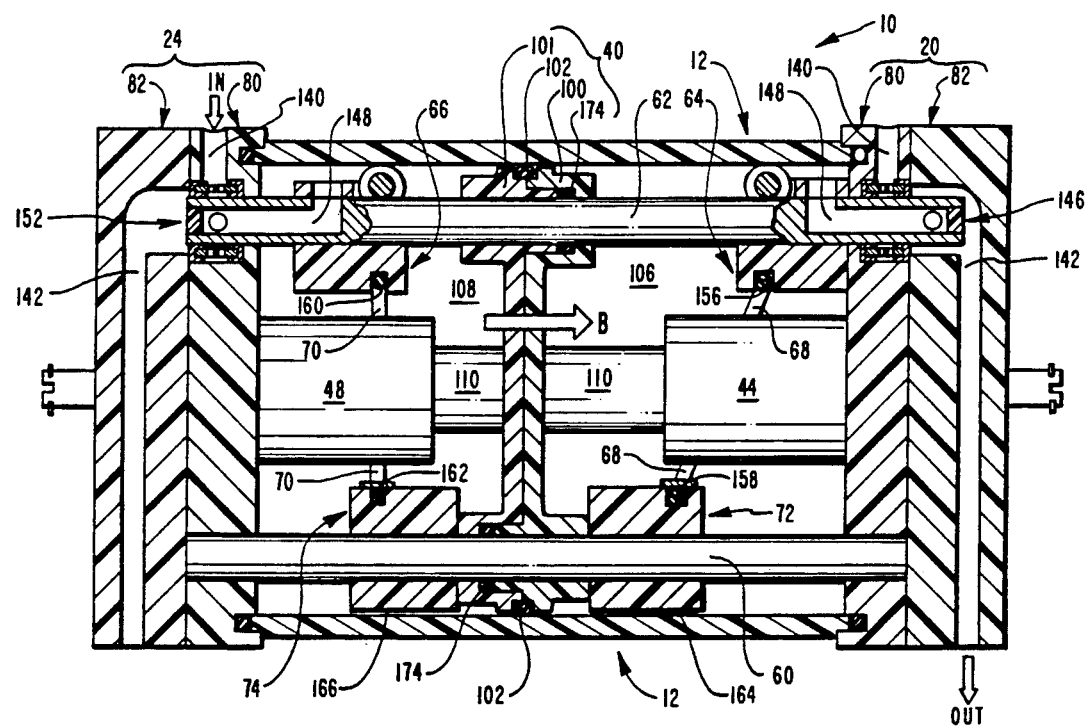
FIG. 3B is a cross-sectional view of the device shown in FIG. 3A in a succeeding second stage of operation.
Figure 3C:
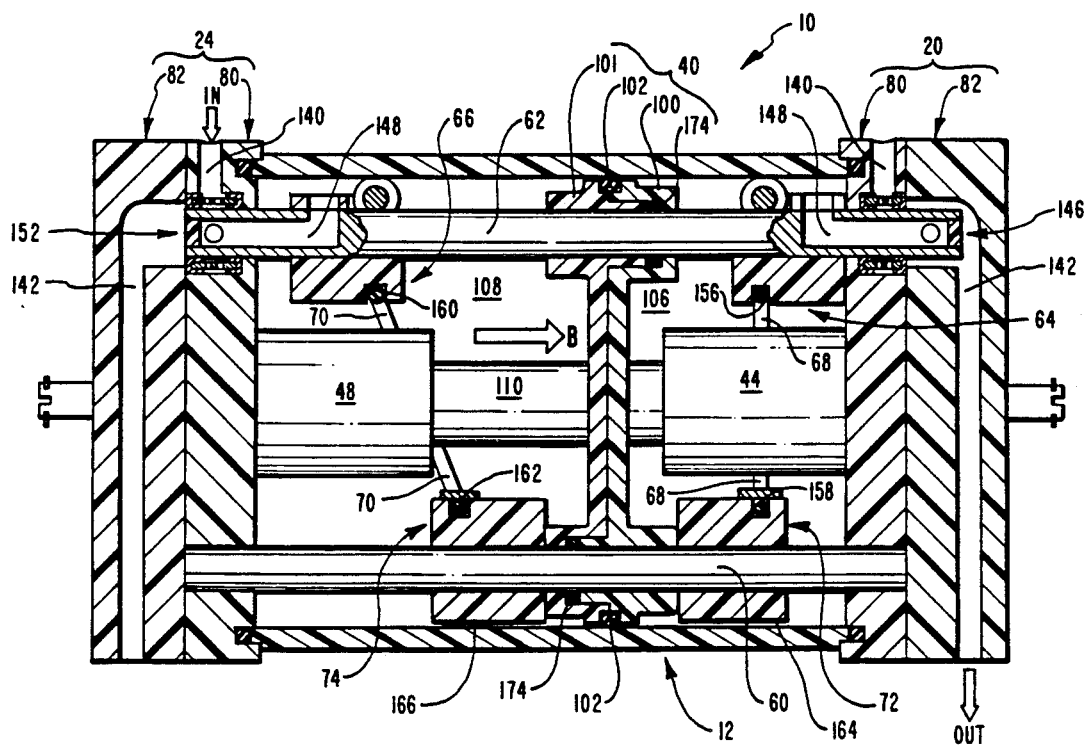
FIG. 3C is a cross-sectional view of the device shown in FIGS. 3A and 3B shown in a succeeding third stage of operation.

The manner in which the direction of movement of drive piston 40 is reversed will now be disclosed in relation to the sequence of FIGS. 3A, 3B, 3C, and 3C.

First, however, the structures illustrated in these figures will be explained in some detail by reference to FIG. 3A. There, drive piston 40 can be seen to be positioned within drive cylinder 12 separating first drive fluid chamber 106 from second drive fluid chamber 108. Drive piston 40 engages in reciprocating motion stabilized by guide shaft 60 and valving shaft 62 the ends of both of which are constrained from lateral movement by first and second plate assemblies 20, 24, respectively. Drive piston 40 slides freely upon both guide shaft 60 and valving shaft 62. While guide shaft 60 is also constrained from movement in its longitudinal direction, valving shaft 62 is longitudinally slidable back and forth in first plate assembly 20 and second plate assembly 24.

In order to admit pressurized drive fluid alternately into first drive fluid chamber 106 and second drive fluid chamber 108, the proportioning pump disclosed herein includes a drive reversal means. As shown by way of example and not limitation, a pressurized drive fluid passageway 140 is formed in each drive cylinder end plate 80, and a drive fluid exit passageway 142 is formed in each valve plate 82. Neither pressurized drive fluid passageway 140, nor drive fluid exit passageway 142, communicate directly with the interior of drive cylinder 12.

Further, a first valve means is provided for placing pressurized drive fluid passageway 140 and drive fluid exit passageway 142 in first plate assembly 20 alternately in communication with first drive fluid chamber 106. By way of example and not limitation, this first valve means comprises a first valve bore 144 extending from first drive fluid chamber 106 into first plate assembly 20 and communicating with both pressurized drive fluid passageway 140 and drive fluid exit passageway 142 therein.

A valve stem 146 formed on the end of valving shaft 62 is slidably mounted in valve bore 144 in first plate assembly 20. Longitudinally formed in valve stem 146 is a valving passageway 148. Valving passageway 148 opens at one other end thereof through an aperture 150 into either of pressurized drive fluid passageway 140 or drive fluid exit passageway 142, depending upon the longitudinal position of first valve stem 146 in first valve bore 144. As shown in FIG. 3A, the position of first valve stem 146 is such that aperture 150 is within drive fluid exit passageway 142, whereby first drive fluid passageway 106 is vented through valving passageway 148 to permit the positive displacement of drive fluid from first drive fluid chamber 106.

Correspondingly, a second valve means is provided for placing pressurized drive fluid passageway 140 and drive fluid exit passageway 142 in second plate assembly 24 alternately in communication with second drive fluid chamber 108. By way of example and not limitation, this second valve means comprises a second valve stem 152 at the end of valving shaft 52 remote from first valve stem 146 and a second valve bore 154 in which second valve stem 152 is slidably mounted. Second valve bore 154 extends from second drive fluid chamber 108 into second plate assembly 24 and communicates with both pressurized drive fluid passageway 140 and drive fluid exit passageway 142 formed therein. Formed longitudinally in second valve stem 152 is a valving passageway 148 which opens at one end thereof into second drive fluid chamber 108. The other end of valving passageway 148 in second valve stem 152 opens through an aperture 150 into either pressurized drive fluid passageway 140 or drive fluid exit passageway 142 in second plate assembly 24, depending on the longitudinal position of second valve stem 152 in second valve bore 154.

Figure 3D:
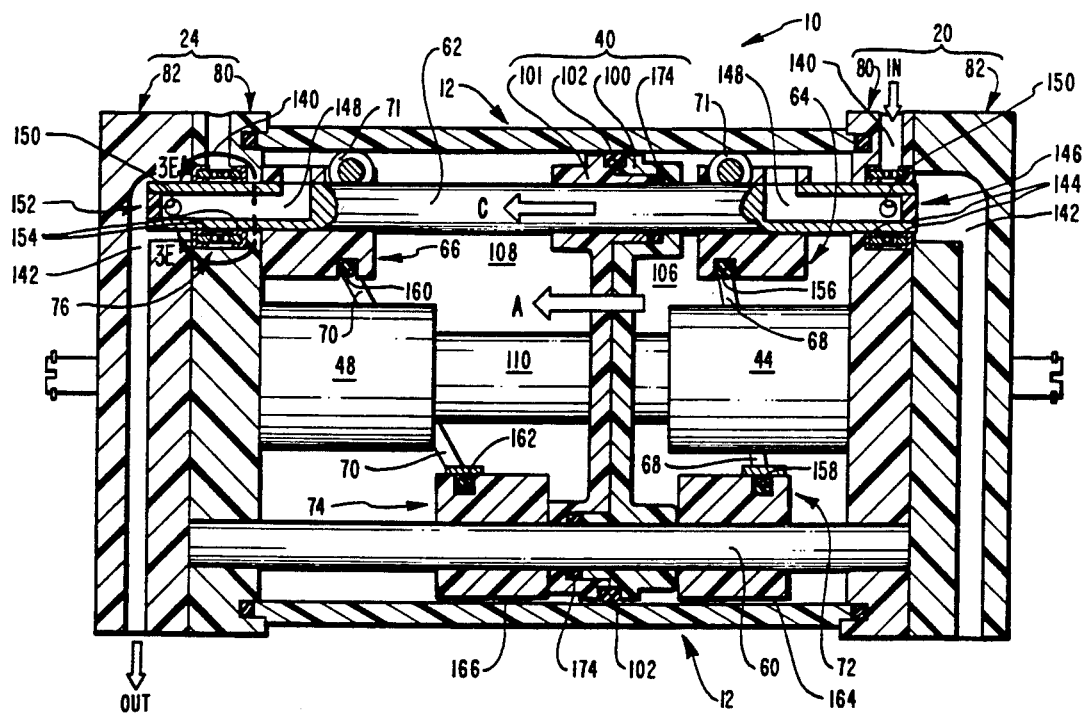
FIG. 3D is a cross-sectional view of the device shown in FIGS. 3A–3C shown in a succeeding fourth stage of operation.
Figure 3E:
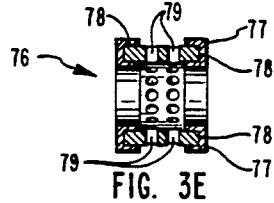
FIG. 3E is an enlarged cross-sectional view of the seal assembly identified in FIG. 3D with the valve stem in the foreground thereof deleted.

As shown in FIG. 3D, each of first and second valve bores 144, 154 is provided with a seal assembly 76. The elements of each seal assembly 76 are shown in greater detail in FIG. 3E, wherein valving shaft 62 has been eliminated from the foreground to enhance clarity. Seal assemblies 76 include a pair of square-D seals 77 that encircle valving shaft 62 and open toward each other in an opposed relationship. Compressed between each pair of square-D seals 77 is a rigid cylindrical sleeve that also encircles valving shaft 62. Sleeve 78 has formed therethrough a plurality of perforations 79 which permit drive fluid in pressurized drive fluid passageway 140 to flow into proximity with the sides of valving shaft 62 and to enter aperture 150 when the position of valving shaft 62 locates aperture 150 within seal assembly 76.

The operation of first and second valve stems 146, 152, respectively, is coordinated by a linkage means comprising valving shaft 62. Valving shaft 62 serves to operate first and second valve stems 146, 152, respectively, in either a first or a second operative mode. In the first operative mode, first drive fluid chamber 106 is placed in communication with pressurized drive fluid passageway 140 formed in first plate assembly 20, while second drive fluid chamber 108 is placed in communication with drive fluid exit passageway 142 formed in second plate assembly 24. In the first operative mode, drive piston 40 is urged in the direction of second drive fluid chamber 108 from which non-pressurized drive fluid is thereby positively displaced. The first operative mode is illustrated in FIGS. 3A–3C.

In the second operative mode of first and second valve stems 146, 152, respectively, first drive fluid chamber 106 is placed in communication with drive fluid exit passageway 142 formed in first plate assembly 20, while second drive fluid chamber 108 communicates with pressurized drive fluid passageway 140 formed in second plate assembly 24. In the second operative mode, drive piston 40 is urged in the direction of first drive fluid chamber 106, accordingly displacing therefrom non-pressurized drive fluid. The second operative mode is illustrated in FIG. 3D and will be more readily understood following a short discussion of the manner in which valving shaft 62 is driven alternately into the first and the second operative mode.

This is accomplished using the same source of power as causes movement in drive piston 40, namely the pressurized drive fluid. Toward this end, the inventive proportioning pump comprises an over-center means for driving valving shaft 62 to operate first valve stem 146 and second valve stem 152 between the first and second operative modes in response to the completion of each of the successive strokes of the reciprocal motion of drive piston 40. As shown in FIG. 3A by way of example and not limitation, the overcenter means of the present invention comprises a linkage bearing surface and a drive bearing surface on either side of drive piston 40 and a resilient spring compressed therebetween. Each linkage bearing surface is fixed to valving shaft 62, while each drive bearing surface is fixed to drive piston 40.

On the side of drive piston 40 facing first drive fluid chamber 106, the linkage bearing surface and drive bearing surface take the form, respectively, of a slot 156 formed in first valve block 64 and a slot 158 formed in first spring shoe 72. As first spring shoe 72 is slidable upon guide shaft 60, slot 158 is moveable in each successive stroke of the reciprocating motion of drive piston 40 into a center position relative slot 156 in which slots 156 and 158 are maximally proximate. First spring 68 mounted in compression between slots 156 and 158 urges slot 156 in first valve block 64 and valving shaft 62 attached thereto into the first operative mode when slot 158 is on the side of the center position thereof adjacent to drive piston 40. When slot 158 is on the side of the center position thereof remote from drive piston 40, first spring 68 urges slot 156 in first valve block 64 and valving shaft 62 into the second operative mode. Slots 156 and 158 can be seen in the center position of slot 158 in FIG. 3C.

On the side of drive piston 40 adjacent to second drive fluid chamber 108 are a second linkage bearing surface and a second drive bearing surface taking the form, respectively, of a slot 160 formed in second valve block 66 and a slot 162 formed in second spring shoe 74. As second spring shoe 74 is slidable upon guide shaft 60, slot 162 is moveable in each successive stroke of drive piston 40 into a center position relative to slot 160 in which slots 162 and 160 are maximally proximate. Second spring 70 mounted in compression between slots 160, 162, urges slot 160 in second valve block 66 and valving shaft 62 attached thereto into the first operative mode when slot 162 is on the side of the center position thereof remote from drive piston 40. When slot 162 is on the side of the center position thereof adjacent to drive piston 40, second spring 70 urges slot 160 in second valve block 66 and valving shaft 62 attached thereto into the second operative mode. Slots 160 and 162 can be seen in the center position of slot 162 in FIG. 3B.

The operation of the drive reversal means of the present invention will now be explained by reference to the sequence of FIGS. 3A–3D. In FIG. 3A, first and second valve stems 146, 152, respectively, are in the second operative mode. First drive fluid chamber 106 is in communication through first valve stem 146 with drive fluid exit passageway 42 formed in first plate assembly 20, while second drive fluid chamber 108 is in communication through second valve stem 152 with pressurized drive fluid passageway 140 formed in second plate assembly 24. Under these conditions, the pressure of drive fluid in second drive fluid chamber 108 impels drive piston 40 to the right as shown in FIG. 3A by arrow B. In the process, drive fluid is positively displaced from first drive fluid chamber 106 through valving passageway 148 in first valve stem 146 and drive fluid exit passageway 142 formed in first plate assembly 20. Simultaneously, one of the constituent fluids is also positively displaced from proportioning cylinder 44, while the same or a different constituent fluid is drawn into proportioning cylinder 48 on the opposite side of drive piston 40. Movement of drive piston 40 in the direction of arrow B with first and second spring shoes 72, 74, respectively, attached thereto initially tends to bring both slot 158 and slot 162 closer to the center positions of each.

In FIG. 3B, movement of drive piston 40 in the direction shown by arrow B is seen to have brought slot 162 into the center position thereof, maximally proximate to slot 160. This results in the placement of second spring 70 in maximum compression. In FIG. 3B first and second valve stems 146, 152, respectively, are still in the second operative mode with first drive fluid chamber 106 being vented through first valve stem 146 into drive fluid exit passageway 142 formed in first plate assembly 20 and second drive fluid chamber 108 being pressurized through second valve stem 152 from pressurized drive fluid passageway 140 formed in second plate assembly 24. Under such conditions, movement of drive piston 40 in the direction of arrow B continues, as pressurized drive fluid fills second drive fluid chamber 108, moving drive piston 40 in the direction of arrow B and positively displacing drive fluid from first drive fluid chamber 106. Concomitantly, constituent fluid continues to be displaced from proportioning cylinder 44, while the same or another of the constituent fluids is drawn into proportioning cylinder 48.

Continued movement of drive piston 40 in the direction of arrow B eventually brings slot 162 to the side of the center position thereof adjacent to drive piston 40, whereby spring 70 will commence to urge second valve block 66 and valving shaft 62 attached thereto out of the second operative mode. Nevertheless, the urging of first spring 68 in the opposite direction precludes any shift of position of valving shaft 62 for a period of continued movement of drive piston 40 in the direction of arrow B.

That continued movement of drive piston 40 in the direction shown by arrow B in FIG. 3B brings the components of proportioning pump 10 into the relationship shown in FIG. 3C. There, slot 158 has reached the center position thereof relative to slot 156. Accordingly, first spring 68 is in the maximum state of compression thereof, and any further movement of drive piston 40 in the direction shown by arrow B will take slot 158 to the side of the center position thereof remote from drive piston 40, causing first spring 68 to also urge first valve block 64 and valving shaft 62 attached thereto out of the second operative mode. The positioning of slot 162 on the side of the center position thereof adjacent to drive piston 40 instead tends to urge valving shaft 62 and second valve block 66 out of the second operative mode, so that the over-center means of the disclosed invention, as shown in FIG. 3C, is about to drive the valving means thereof into a new operative mode and reverse the driven direction of drive piston 40. Nevertheless, prior to that reversal, first and second valve stems 146, 152, respectively, remain in the second operative mode with pressurized drive fluid entering second drive fluid chamber 108 through second valve stem 152 and pressurized drive fluid passageway 140 in second plate assembly 24. Fluid in first drive fluid chamber 106 is positively displaced therefrom through second valve stem 152 and drive fluid exit passageway 142 formed in first plate assembly 20.

FIG. 3D shows the relationship of the components of proportioning pump 10 after movement of drive piston 40 in the direction of arrow B past the position shown in FIG. 3C. Such movement displaces slot 158 to the side of the center position thereof remote from drive piston 40, resulting in the biasing force of both first spring 68 and second spring 70 urging both first and second valve block 64, 66, respectively, and valving shaft 62 attached thereto out of the second operative mode. Facilitated by rollers 71, first and second valve blocks 64, 66, respectively, and valving shaft 62 attached thereto snap leftwardly as seen in FIG. 3D in the direction indicated by arrow C.

In FIG. 3D this has occurred. As a result, aperture 150 in first valve stem 146 no longer communicates with drive fluid exit passageway 142 in first plate assembly 20, but rather opens onto pressurized drive fluid passageway 140 formed therein. At the opposite end of valving shaft 62, second valve stem 152 has shifted position so that aperture 50 therein no longer communicates with pressurized drive fluid passageway 140 in second plate assembly 24, but instead vents second drive fluid chamber 108 into drive fluid exit passageway 142 formed in second plate assembly 24. This is the second operative position for first and second valve stems 146, 152, respectively.

Under such conditions, pressurized drive fluid enters first drive fluid chamber 106 and begins to impel drive piston 40 leftwardly as seen in FIG. 3D in the direction shown by arrow A. Correspondingly, drive fluid in second drive fluid chamber 108 begins to be positively displaced therefrom through drive fluid exit passageway 142 formed in second plate assembly 24. The action upon the constituent fluid or fluids in proportioning cylinders 44, 48 is also reversed. Constituent fluid begins to be displaced from proportioning cylinder 48 and drawn into proportioning cylinder 44. Movement in the direction of arrow A will continue, bringing first slot 158 into the center position thereof and thereafter slot 162 into its center position. Further movement will then trigger the over-center means of the inventive proportioning pump, altering the valving of pressurized drive fluid and reversing the direction of drive piston 40 as the relative relationships shown in FIG. 3A are reassumed. As a general rule the trailing slot in terms of the direction of travel of drive piston 40 is, in the embodiment disclosed, the first to reach its center position.

The prompt reversal of drive fluid valving through operation of the over-center means of the inventive proportioning pump is facilitated by the contrasting manner in which valve blocks 64, 66 and spring shoes 72, 74 bear against inner surface 67 of drive cylinder 12. In both instances, a sliding interaction must be achieved, but it is preferable that the sliding motion effected between valve blocks 64, 66 and inner surface 67 be substantially freer of resistance than the sliding relationship structured between shoe springs 72, 74 and inner surface 67.

As illustrated n each of FIGS. 3A–3D first spring shoe 72 and second spring shoe 74 are provided with curved bearing surfaces 164, 166, respectively, which slide upon inner surface 67 during the reciprocating motion of drive piston 40. By contrast, neither first valve block 64 nor second valve block 66 bears directly against inner surface 67. Instead, in each instance roller 71 is interposed therebetween in order to substantially decrease the frictional resistance to movement of valve blocks 64, 66 and valving shaft 62 when the components of the over-center means of the inventive proportioning pump reach a position that necessitates the reversal of the valving of the drive fluid. Due to the relatively substantial friction between bearing surfaces 164, 166 and inner surface 67 of cylinder 12, first spring shoe 72 and second spring shoe 74 can serve as a stable fulcrum about which valve block 64, 66 can pivot in effecting movement of valve shaft 62 back and forth between the first and second operative modes thereof.

Proportioning pump 10 is thus reliably driven in a reciprocating motion without the aid of any auxiliary power source other than a pressurized drive fluid. In the process, the pressurized drive fluid and at least a first and a second constituent fluid are dispensed in a predetermined precise ratio one to the other. Operation within the industry standard of ± 3 percent accuracy is easily attained in the inventive proportioning pump. In many cases a range of ± 1 percent accuracy has been consistently achieved.

All moving parts required to effect this functioning are compactly housed interior to drive cylinder 12, and a continuous flow is effected due to the positive displacement developed in both directions of the reciprocating motion of the pump. The simplicity of the disclosed design renders proportioning pump 10 easy to assembly and rarely in need of maintenance Adjustment rods 132 discussed in relation to FIG. 2 permit the discharge proportion among the plurality of fluids being processed to be selectively varied without incurring any down time.

An additional advantage of the design disclosed resides in the fact that all dynamic seals incorporated thereinto are fully lubricated on both sides thereof by the fluids being dispensed. Thus, sealing ring 104, O-rings 174, and seal assemblies 76 are lubricated on both sides thereof by the drive fluid. By reference to FIG. 2 it will be appreciated that O-rings 126 and O-rings 127 are lubricated on one side by the drive fluid and on the other side by one of the constituent fluids being dispensed by the inventive proportioning pump. The wetting of these movable seals on both sides thereof contributes substantially to the enhanced effective lifetime thereof. Only in relation to O-rings 138 encircling adjustment rod 132 is this not the case 0-rings 138 are lubricated on one side by a constituent fluid and are on the other side exposed to the atmosphere. This 0-ring is static except during infrequent and short duration adjustments.

Of further interest, FIG. 4 shows a disassembled perspective view of the components of drive piston 40. These include identical first and second drive piston plates 100, 101, respectively, mated in a back-to-back relationship at surfaces 168. In each of the drive piston plates is formed a pair of openings 169 through which pass guide shaft 60 and valving shaft 62 when proportioning pump 10 is assembled. Each drive piston plate is provided at one of openings 169 with a sleeve 170 projecting from surface 168. AT the other opening 169 a recess 172 is formed in surface 168. In the back-to-back relationship of drive piston plates 100, 101, projecting sleeve 170 of each is received into recess 172 of the other. In the assembly of first and second drive piston plates 101, 102, respectively, an O-ring 174 is disposed in recess 172. As seen in FIGS. 3A-3D, O-ring 174 forms a seal with guide shaft 60 and valving shaft 62 slidably disposed in openings 169.

FIG. 5 illustrates an alternative, and in the present case preferred, embodiment of the valve blocks, spring shoes, and springs of the over-center means of the present invention. In contrast to first or second springs 68, 70 shown in FIG. 1, FIG. 5 shows a pair of resilient, C-shaped springs 180, which when assembled are compressed between a valve block 182 and a spring shoe 184. In order to optimize the motive power for the over-center means of the present invention, it has been found advantageous to configure C-shaped springs 180 with an ambit between the free ends thereof that is slightly greater than 180°. Each end of C-shaped spring 180 is provided with a mounting ball 186 that is snappingly receivable into corresponding sockets 188 formed in face 190 of valve block 182 and opposing face 192 of spring shoe 184. Sockets 188 function as spring receiving slots and are thus the sites off drive bearing surfaces and linkage bearing surfaces between which C-shaped springs 180 are actually compressed. In other respects, valve block 182 may be similar in structure to valve blocks 64, while spring shoe 184 corresponds in structure to that of spring shoes 72.

The use of two springs, such as C-shaped springs 180, has been found to result in several advantages over the use of single unitary springs, such as springs 68, 70 shown in FIG. 1. The pair of C-shaped springs 180 exhibit less fatigue and therefore enjoy longer effective lifetimes than single-piece springs. In addition, the stresses of compression between the valve blocks and shoe springs is more evenly distributed to each side thereof using the two-spring configuration. Providing C-shaped springs 180 with an ambit greater than 180° results in a more even distribution of stresses along the length of the springs than if these were merely semicircular.

The subject invention also embodies methods for proportioning a plurality of at least three fluids in a precise, predetermined ratio. The methods comprise the steps of providing a pressurized drive fluid alternately to opposite sides of a drive piston in a drive cylinder, while venting the side of the piston not provided with the drive fluid. This causes reciprocating motion in the drive piston and the positive displacement of drive fluid from the leading side thereof. Further, the methods comprise the step of securing within the drive cylinder on each side of the drive piston a pair of proportioning pistons. These extend from the drive piston parallel to the axis of the drive cylinder into corresponding proportioning cylinders that face the drive piston within each end of the drive cylinder. The proportioning pistons advance into the recede within corresponding proportioning pistons with the reciprocating motion of said drive piston. Constituent fluid is supplied to the proportioning cylinders when the pistons therein recede therein, and is vented from the proportioning cylinders when the pistons therein advance thereinto. The disclosed methods require reversing the valving of the drive fluid when each stroke of the reciprocating motion of the drive piston nears its extremes.

The present invention may be embodiment in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A method for dispensing a drive fluid and a first and second constituent fluid in a precise, predetermined ratio, said method comprising the steps of:
   (a) valving a pressurized drive fluid alternately to opposite sides of a drive piston in a drive cylinder using valving within said cylinder;
   (b) venting the side of the piston not provided with the pressurized drive fluid to enable reciprocating motion of the piston and the positive displacement of drive fluid from said side of the piston not provided with the pressurized drive fluid;
   (c) securing within the drive cylinder on each side thereof a pair of proportioning pistons which extend parallel to the axis of the drive cylinder into individual corresponding proportioning cylinders that open into said drive cylinder facing said drive piston, said proportioning pistons advancing into and receding within said corresponding proportioning pistons with said reciprocating motion of said drive piston;
   (d) supplying constituent fluids to said proportioning cylinders as said proportioning pistons recede therein; and
   (e) venting said proportioning cylinders as said proportioning pistons advance thereinto to enable the positive displacement of constituent fluid therefrom.

2. An apparatus for dispensing in a precise predetermined ratio quantities of a first fluid that is externally pressurized and a second fluid, said apparatus comprising:
   (a) reciprocating means for continuously dispensing the first fluid, said reciprocating means comprising a stationary portion enclosing opposed first and second fluid chambers and an active portion housed within said stationary portion, said stationary portion comprising a drive cylinder closed at the end thereof adjacent said first fluid chamber by a first plate assembly and at said end thereof adjacent said second fluid chamber by a second plate assembly, said active portion being driven by the first fluid in a reciprocating motion comprising successive strokes in opposite directions alternately toward said first and toward said second fluid chambers, said active portion comprising:
      (i) a drive piston disposed in said drive cylinder between said first and second fluid chambers, said drive piston being driven in a reciprocating motion by said externally pressurized first fluid; and
      (ii) drive reversal means for admitting the pressurized first fluid alternately into said first and said second fluid chambers to propel said drive piston and thereby to positively displace first fluid alternately from said second and first fluid chambers, respectively, said drive reversal means comprising:
         (A) a pressurized first fluid passageway formed in each of said plate assemblies;
         (B) a first fluid exit passageway formed in each of said plate assemblies;
         (C) a first valve bore extending from said first fluid chamber into said first plate assembly, said first valve bore communicating with said pressurized first fluid passageway and said first fluid exit passageway formed therein;
         (D) a second valve bore extending from said second fluid chamber into said second plate assembly, said second valve bore communicating with said pressurized first fluid passageway and said first fluid exit passageway formed therein;
      (E) a first valve stem slidably mounted in said first valve bore and extending therefrom into said first fluid chamber, said first valve stem having formed longitudinally therethrough a first valving passageway opening at one end thereof into said first fluid chamber, the other end of said first valving passageway opening within said first valve bore at a location that alternatively communicates with said pressurized first fluid passageway and with said first fluid exit passageway in said first plate assembly;
         (F) a second valve stem slidably mounted in said second valve bore and extending therefrom into said second fluid cylinder, said second valve stem having formed longitudinally therethrough a second valving passageway opening at one end thereof into said second fluid chamber, the other end of said second valving passageway opening within said second valve bore at a location that alternatively communicates with said first fluid exit passageway and said pressurized first fluid passageway in said second plate assembly;

(G) a valve shaft connecting said first and second valve stems to slide said valve stems longitudinally alternately between a first and a second operative mode, in said first operative mode said first fluid chamber being in communication with said pressurized first fluid passageway formed in said first plate assembly and said second drive fluid chamber being in communication with said first fluid exit passageway formed in said second plate assembly, and in said second operative mode said first fluid chamber being in communication with said first fluid exit passageway formed in said first plate assembly and said second first fluid chamber being in communication with said pressurized first fluid passageway formed in said second plate assembly;

(b) first and second reservoir means for holding a predetermined quantity of the second fluid, said first and second reservoir means being located individually in said first and second fluid chambers, respectively; and (c) fluid advancement means for continuously dispensing the second fluid, said fluid advancement means being operably connected to said active portion of said reciprocating means to draw a predetermined quantity of the second fluid into one of said first and second reservoir means and to positively displace a predetermined quantity of the second fluid from the other of said first and second reservoir means during each of said strokes in said motion of said reciprocating means.

3. An apparatus as recited in claim 2, wherein said drive reversal means further comprises:

(a) a linkage bearing surface rigidly attached to said valve shaft on a first side of said drive piston;

(b) a drive bearing surface rigidly attached to said drive piston on said first side thereof, said bearing surface being movable in each successive stroke of said motion of said reciprocating means into a center position relative said linkage bearing surface in which said drive bearing surface is maximally proximate thereto; and (c) a spring mounted in compression between said linkage and said bearing surfaces, said spring urging said linkage bearing surface and said valving shaft attached thereto into said first operative mode on one side of said center position of said drive bearing surface and into said second operative mode on the other side of said center position of said drive bearing surface.

4. An apparatus for dispensing in a precise predetermined ratio quantities of a first fluid that is externally pressurized and a second fluid, said apparatus comprising:

(a) reciprocating means for continuously dispensing the first fluid, said reciprocating means comprising a stationary portion enclosing opposed first and second fluid chambers and an active portion housed within said stationary portion, said active portion, said active portion being driven in a reciprocating motion comprising successive strokes in opposite directions alternately toward said first and toward said second fluid chambers;

(b) first and second reservoir means for holding a predetermined quantity of the second fluid, said first and second reservoir means being located individually in said first and second fluid chambers, respectively; and (c) fluid advancement means for continuously dispensing the second fluid, said fluid advancement means being operably connected to said active portion of said reciprocating means to draw a predetermined quantity of the second fluid into one of said first and second reservoir means and to positively displace a predetermined quantity of the second fluid from the other of said first and second reservoir means during each of said strokes in said motion of said reciprocating means, said fluid advancement means comprising:

(i) a first proportioning piston extending from said active portion of said reciprocating means into said first fluid chamber and having a proportioning piston head disposed in said first reservoir means;

(ii) a second proportioning piston oppositely directed to said first proportioning piston and extending from said active portion of said reciprocating means into said second fluid cylinder and having a proportioning piston head disposed in said second reservoir means; and (iii) means to permit waste movement of said active portion of said reciprocating means relative to at least one of said proportioning piston heads in each stroke of said motion of said active portion, said means to permit waste movement comprising:

(A) a proportioning piston shaft extending from said active portion of said reciprocating means and slidably passing through said at least one of said proportioning piston heads into said proportioning cylinder corresponding thereto; and (B) a radially enlarged retaining head on the end of said proportioning piston shaft;

said waste movement of said active position relative to said at least one of said proportioning piston heads comprising movement of said at least one of said proportioning piston heads longitudinally relative said proportioning piston shaft in both directions between said radially enlarged retaining head and said active portion of said reciprocating means.

5. An apparatus as recited in claim 4, wherein said fluid advancement means further comprises:

(a) cooperating threading securing said proportioning piston shaft to said active portion of said reciprocating means;

(b) an internal adjustment fitting on said retaining head by which said proportioning piston shaft may be rotated to vary the distance between said retaining head and said active portion of said reciprocating means;

(c) a linear adjustment opening between the exterior of said proportioning pump and said proportioning cylinder corresponding to said at least one of said proportioning piston heads;

(d) an adjusting rod slidably and rotatably mounted in said adjustment opening;

(e) an adjustment transfer tool on the end of said adjusting rod directed toward said at least one of said proportioning piston heads for engaging said internally adjustment fitting on said retaining head; and (f) an external adjustment fitting on the other end of said adjusting rod for rotating said adjusting rod and said proportioning piston shaft when said adjusting rod is advanced in said adjustment opening and engages said internal adjustment fitting with said adjustment transfer tool.

6. A fluid drive proportioning pump powered by and dispensing an externally pressurized drive fluid, said pump comprising:

(a) a drive cylinder comprising a tube closed at each end thereof by a plate assembly;

(b) a drive piston disposed in said drive cylinder and propelled by the drive fluid in a reciprocating motion comprising successive strokes of said drive piston in opposite directions, said drive piston separating said drive cylinder into a first and a second drive fluid chamber; and (c) drive reversal means for admitting the pressurized drive fluid alternately into said first and said second drive fluid chambers to propel said drive piston in said reciprocating motion and thereby to positively displace drive fluid alternately from said second and first drive fluid chambers, respectively, said drive reversal means comprising:

(i) a pressurized drive fluid passageway formed in each of said plate assemblies;

(ii) a drive fluid exit passageway formed in each of said plate assemblies;

(iii) first valve means for placing said first drive fluid chamber in communication alternately with said pressurized drive fluid passageway and with said drive fluid exit passageway formed in said plate assembly adjacent to said first drive fluid chamber;

(iv) second valve means for placing said second drive fluid chamber in communication alternately with said pressurized drive fluid passageway and with said drive fluid exit passageway formed in said plate assembly adjacent to said second drive fluid chamber;

(v) linkage means for operating said first and second valve means in either a first or a second operative mode, in said first operative mode said first drive fluid chamber being in communication with said pressurized drive fluid passageway formed in said plate assembly adjacent thereto and said second drive fluid chamber being in communication with said drive fluid exit passageway formed in said plate assembly adjacent thereto, and in said second operative mode said first drive fluid chamber being in communication with said drive exit passageway formed in said plate assembly adjacent thereto and said second drive fluid chamber being in communication with said pressurized drive fluid passageway formed in said end plate adjacent thereto; and (vi) an over-center means for driving said linkage means to operate said first and second valve means between said first and second operative modes responsive to completion of each of said successive strokes of said reciprocal motion of said drive piston, said first valve means comprising:

(A) a first valve bore extending from said first drive fluid chamber into said plate assembly adjacent thereto, said first valve bore communicating with said pressurized drive fluid passageway and said drive fluid exit passageway formed therein; and (B) a first valve stem slidably mounted in said first valve bore and extending therefrom into said first drive fluid cylinder, said first valve stem having formed longitudinally therethrough a first valving passageway opening at one end thereof into said first drive fluid chamber in both said first and second operative modes, the other end of said first valving passageway opening within said first valve bore at a location that communicates with said pressurized drive fluid passageway in said first operative mode and with said drive fluid exit passageway in said second operative mode.

7. A proportioning pump as recited in claim 6, wherein said second valve means comprises:

(a) a second valve bore extending from said second drive fluid chamber into said plate assembly adjacent thereto, said second valve bore communicating with said pressurized drive fluid passageway and said drive fluid exit passageway formed therein; and (b) a second valve stem slidably mounted in said second valve bore and extending therefrom into said second drive fluid cylinder, said second valve stem having formed longitudinally therethrough a second valving passageway opening at one end thereof into said second drive fluid chamber in both said first and said second operative modes, the other end of said second valving passageway opening within said second valve bore at a location that communicates with said drive fluid exit passageway formed in said first operative mode and with said pressurized drive fluid passageway in said second operative mode.

8. A proportioning pump as recited in claim 7, wherein said linkage means comprises a valving shaft connecting said first and second valve stems and slidably passing through said drive piston, thereby to permit movement of said drive piston relative said valving shaft during said reciprocal motion thereof and whereby to permit movement of said valving shaft to drive said first and second valve means between said first and second operative modes.

9. An apparatus for dispensing in a precise, predetermined ratio quantities of a first fluid that is externally pressurized and a second fluid, said apparatus pump comprising:

(a) reciprocating means for continuously dispensing the first fluid, said reciprocating means comprising a stationary portion enclosing opposed first and second fluid chambers and an active portion housed within said stationary portion, said active portion being driven in a reciprocating motion comprising successive strokes in opposite directions alternately toward said first and toward said second fluid chambers;

(b) drive reversal means located in said stationary portion of said reciprocating means for admitting the first fluid under pressure alternately into said first and said second fluid chambers, thereby to drive said active portion in said reciprocating motion and positively displace the first fluid alternately from said second and first fluid chambers, respectively;

(C) first and second reservoir means for holding a predetermined quantity of the second fluid, said first and second reservoir means being located individually in said first and second fluid chambers, respectively; and (d) fluid advancement means for continuously dispensing the second fluid, said fluid advancement means being operatively connected to said active portion of said reciprocating means to draw a predetermined quantity of the second fluid into one of said first and second reservoir means and to positively displace a predetermined quantity of the second fluid from the other of said first and second reservoir means during each of said strokes in said motion of said reciprocating means.

10. An apparatus as recited in claim 9, wherein said fluid advancement mean comprises oppositely directed first and second proportioning pistons, said first proportioning piston extending from said active portion of said reciprocating means into said first fluid chamber and having a proportioning piston head disposed in said first reservoir means, said second proportioning piston extending from said active portion of said reciprocating means into said second fluid cylinder and having a proportioning piston head disposed in said second reservoir means.

11. An apparatus as recited in claim 10, wherein said fluid advancement means further comprises means to permit waste movement of said drive piston relative to at least one of said proportioning piston heads in each stroke of said motion of said reciprocating means.

12. An apparatus as recited in claim 9, wherein the first fluid is externally pressurized and serves to drive said action portion of said reciprocating means in said motion thereof, and wherein:

(a) said stationary portion of said reciprocating means comprises a drive cylinder closed at the end thereof adjacent said first fluid chamber by a first plate assembly and at said end thereof adjacent said second fluid chamber by a second plate assembly; and (b) said active portion of said reciprocating means comprises:

(i) a drive piston disposed in said drive cylinder between said first and second fluid chambers, said drive piston being driven in a reciprocating motion by said externally pressurized first fluid; and (ii) drive reversal means for admitting the pressurized first fluid alternately into said first and said second fluid chambers to propel said drive piston and thereby to positively displace first fluid alternately from said second and first fluid chambers, respectively.

13. An apparatus as recited in claim 12, wherein said first reservoir means comprises a proportioning cylinder projecting from said first plate assembly into said first fluid chamber and a second fluid passageway formed in said first plate assembly through which the second fluid is admitted and expelled from said proportioning cylinder.

14. An apparatus as recited in claim 13, wherein said first reservoir means further comprises:

(a) an intake passageway, formed in said first plate assembly and communicating between said second fluid passageway and the exterior of said first plate assembly;

(b) a first check valve located within said intake passageway oriented to permit one-way flow of the second fluid into said proportioning cylinder;

(c) a venting passageway formed in said first plate assembly and communicating with said second fluid passageway and the exterior of said first plate assembly; and (d) a second check valve located in said venting passageway oriented to permit one-way flow of the second fluid out of said proportioning cylinder.

15. A fluid-driven proportioning pump for dispensing in a precise, predetermined ratio quantities of an externally pressurized drive fluid and a first and a second constituent fluid, said proportioning pump comprising:

(a) a drive cylinder having closed ends;

(b) a drive piston disposed in said drive cylinder and propelled by the drive fluid in a reciprocating motion comprising successive strokes of said drive piston in opposite directions, said drive piston separating said drive cylinder into a first and a second drive fluid chamber;

(c) drive reversal means located in said drive cylinder for admitting the pressurized drive fluid alternately into said first and said second drive fluid chambers to propel said drive piston in said reciprocating motion and thereby to positively displace drive fluid alternately from said second and first drive fluid chambers, respectively;

(d) a pair of proportioning cylinders for the first constituent fluid, one of said proportioning cylinders opening opposite said drive piston into each of said first and said second drive fluid chambers;

(e) a pair of proportioning cylinder for the second constituent fluid, one of said proportioning cylinders opening opposite said drive piston into each of said first and said second drive fluid chambers;

(f) a constituent fluid passageway corresponding to each of said proportioning cylinders through which the constituent fluid corresponding thereto is admitted into and expelled therefrom; and (g) a pair of proportioning pistons projecting from each side of said drive piston, said proportioning pistons extending into corresponding individual ones of said proportioning cylinders, whereby said reciprocating motion of said drive piston alternately advances and retracts said constituent fluid proportioning pistons within said corresponding ones of said proportioning cylinders to alternately draw thereinto and to positively displace therefrom precisely measured quantities of the constituent fluid corresponding thereto.

16. A proportioning pump as recited in claim 15, wherein said drive piston comprises:

(a) a pair of substantially identical drive piston plates mated in a back-to-back relationship and forming in said back-to-back relationship a circumferential retaining slot; and (b) a sealing ring in said retaining slot for engaging the inside of the walls of said drive cylinder.

17. A proportioning pump as recited in claim 15, wherein said drive cylinder comprises a tube closed at each end thereof by a plate assembly.

18. An apparatus as recited in claim 17, wherein said tube is cylindrical.

19. A proportioning pump as recited in claim 17, wherein said proportioning cylinders project from said plate assemblies into said first and second drive fluid chambers.

20. A proportioning pump as recited in claim 17, wherein said constituent fluid passageways, are formed in said plate assemblies.

21. A proportioning pump as recited in claim 17, wherein movement of said drive piston within said drive cylinder is stabilized by means of a guide shaft slidably passing through said drive piston and having each end thereof secured in one of said plate assemblies.

22. A fluid driven proportioning pump powered by and dispensing an externally pressurized drive fluid, said pump comprising:
- (a) a drive cylinder comprising a tube closed at each end thereof by a plate assembly;
- (b) a drive piston disposed in said drive cylinder and propelled by the drive fluid in a reciprocating motion comprising successive strokes of said drive piston in opposite directions, said drive piston separating said drive cylinder into a first and a second drive fluid chamber; and
- (c) drive reversal means for admitting the pressurized drive fluid alternately into said first and said second drive fluid chambers to propel said drive piston in said reciprocating motion and thereby to positively displace drive fluid alternately from said second and first drive fluid chambers, respectively, aid drive reversal means comprising:
  - (i) a pressurized drive fluid passageway formed in each of said plate assemblies;
  - (ii) a drive fluid exit passageway formed in each of said plate assemblies;
  - (iii) first valve means for placing said first drive fluid chamber in communication alternately with said pressurized drive fluid passageway and with said drive fluid exit passageway formed in said plate assembly adjacent to said first drive fluid chamber;
  - (iv) second valve means for placing said second drive fluid chamber in communication alternately with said pressurized drive fluid passageway and with said drive fluid exit passageway formed in said plate assembly adjacent to said second drive fluid chamber;
  - (v) linkage means for operating said first and second valve means in either a first or a second operative mode, in said first operative mode said first drive fluid chamber being in communication with said pressurized drive fluid passageway formed in said plate assembly adjacent thereto and said second drive fluid chamber being in communication with said drive fluid exit passageway formed in said plate assembly adjacent thereto, and in said second operative mode said first drive fluid chamber being in communication with said drive exit passageway formed in said plate assembly adjacent thereto and said second drive fluid chamber being in communication with said pressurized drive fluid passageway formed in said end plate adjacent thereto; and
  - (vi) an over-center means for driving said linkage means to operate said first and second valve means between said first and second operative modes responsive to completion of each of said successive strokes of said reciprocal motion of said drive piston, said over-center means comprising:
    - (A) a first linkage bearing surface rigidly attached to said linkage means on a first side of said drive piston;
    - (B) a first drive bearing surface rigidly attached to said drive piston on said first side thereof, said first drive bearing surface being movable in each successive stroke of said reciprocating motion of said drive piston into a center position relative said first linkage bearing surface in which said second drive bearing surface is maximally proximate thereto; and
    - (C) a first resilient spring mounted in compression between said first linkage and first drive bearing surfaces, whereby said spring urges said first linkage bearing surface and said linkage means attached thereto into said first operative mode on the side of said center position of said first drive bearing surface adjacent said drive piston and into said second operative mode on the side of said center position of said first drive bearing surface remote from said drive piston.

23. A proportioning pump as recited in claim 22, wherein said over-center mechanism further comprises:
- (a) a second linkage bearing surface rigidly attached to said linkage means on a second side of said drive piston opposite from said first side thereof;
- (b) a second drive bearing surface rigidly attached to said drive piston on said second side thereof, said second drive bearing surface being movable in each successive stroke of said reciprocating motion of said drive piston into a center position relative said second linkage bearing surface in which said second drive bearing surface is maximally proximate thereto; and
- (c) a second resilient spring mounted in compression between said second linkage and second drive bearing surfaces, whereby said spring urges said second linkage bearing surface and said linkage means attached thereto into said first operative mode on the side of said center position of said second drive bearing surface remote from said drive piston and into said second operative mode on the other side of said center position of said second drive bearing surface adjacent said drive piston.

24. A proportioning pump as recited in claim 23, wherein said linkage bearing surfaces and said drive bearing surfaces are so positioned relative each other that in each successive stroke of said reciprocating motion of said drive piston said drive bearing surface that follows said drive piston reaches said center position thereof prior to said drive bearing surface that leads said drive cylinder reaching said center position thereof.

25. A proportioning pump as recited in claim 23, wherein said first and second drive bearing surfaces each comprise a spring receiving slot formed in individual spring shoes attached to said drive piston.

26. A proportioning pump as recited in claim 23, wherein said first and second springs each comprise a resilient open loop.

27. A proportioning pump as recited in claim 23, wherein said first and second linkage bearing surfaces each comprise a spring receiving slot formed in individual valve slide blocks attached to said linkage means.

28. A proportioning pump as recited in claim 27, wherein said valve slide blocks are roller mounted against said sides of said drive cylinder for movement longitudinal thereof.

29. A fluid driven pump powered by and dispensing an externally pressurized drive fluid, said pump comprising:
(a) a drive cylinder comprising a tube closed at each end thereof by a plate assembly;
(b) a drive piston disposed in said drive cylinder and propelled by the drive fluid in a reciprocating motion comprising successive strokes of said drive piston in opposite directions, said drive piston separating said drive cylinder into a first and a second drive fluid chamber; and
(c) drive reversal means for admitting the pressurized drive fluid alternately into said first and said second drive fluid chambers to propel said drive piston in said reciprocating motion and thereby to positively displace drive fluid alternately from said second and first drive fluid chambers, respectively, said drive reversal means comprising:
 (i) a pressurized drive fluid passageway formed in each of said plate assemblies;
 (ii) a drive fluid exit passageway formed in each of said plate assemblies;
 (iii) first valve means for placing said first drive fluid chamber in communication alternately with said pressurized drive fluid passageway and with said drive fluid exit passageway formed in said plate assembly adjacent to said first drive fluid chamber, said first valve means comprising a stationary portion and an active portion reciprocatingly slidable therewithin in a first linear path of travel;
 (iv) second valve means for placing said second drive fluid chamber in communication alternately with said pressurized drive fluid passageway and with said drive fluid exit passageway formed in said plate assembly adjacent to said second drive fluid chamber said second valve means comprising a stationary portion and an active portion reciprocatingly slidable therewithin in a second linear path of travel aligned along an axis with said first linear path of travel;
 (v) linkage means for operating said first and second valve means in either a first or a second operative mode, in said first operative mode said first drive fluid chamber being in communication with said drive fluid exit passageway formed in said plate assembly adjacent thereto, and in said second operative mode said first drive fluid chamber being in communication with said drive exit passageway formed in said plate assembly adjacent thereto and said second drive fluid chamber being in communication with said pressurized drive fluid passageway formed in said end plate adjacent thereto; and
 (vi) an over-center means for driving said linkage means to operate said first and said second operative modes responsive to completion of each of said successive strokes of said reciprocal motion of said drive piston.

30. A proportioning pump as recited in claim 29, wherein said over-center means is located in said drive cylinder.

31. A proportioning pump as recited in claim 29, wherein said proportioning pump is provided with dynamic fluid seals associated with said drive reversal means and with said reciprocating motion of said drive piston, and wherein said dynamic seals are lubricated on both sides by the drive fluid.

32. A proportioning pump as recited in claim 29, wherein said over-center means comprises:
(a) a first linkage bearing surface rigidly attached to said linkage means on a first side of said drive piston;
(b) a first drive bearing surface rigidly attached to said drive piston on said first side thereof, said first drive bearing surface being movable in each successive stroke of said reciprocating motion of said drive piston into a center position relative said first linkage bearing surface in which said second drive bearing surface is maximally proximate thereto; and
(c) a first pair of resilient springs mounted in compression between said first linkage and first drive bearing surfaces, whereby said first pair of springs urge said first linkage bearing surface and said linkage means attached thereto into said first operative mode on the side of said center position of said first drive bearing surface adjacent said drive piston and into said second operative mode on the side of said center position of said first drive bearing surface remote from said drive piston.

33. A proportioning pump as recited in claim 32, wherein said over-center mechanism further comprises:
(a) a second linkage bearing surface rigidly attached to said linkage means on a second side of said drive piston opposite from said first side thereof;
(b) a second drive bearing surface rigidly attached to said drive piston on said second side thereof, said second drive bearing surface being movable in each successive stroke of said reciprocating motion of said drive piston into a center position relative said second linkage bearing surface in which said second drive bearing surface is maximally proximate thereto; and
(c) a second pair of resilient springs mounted in compression between said second linkage and second drive bearing surfaces, whereby said first pair of springs urge said second linkage bearing surface and said linkage means attached thereto into said first operative mode on the side of said center position of said second drive bearing surface remote from said drive piston and into said second operative mode on the other side of said center position of said second drive bearing surface adjacent said drive piston.

34. A proportioning pump as recited in claim 32, wherein each spring of said first and second pairs of resilient springs comprises a resilient, C-shaped loop.

35. A proportioning pump as recited in claim 34, wherein said loop has an ambit greater than 180°.

36. A proportioning pump as recited in claim 34, wherein the ends of said loop are provided with mounting balls for securing said springs in compression.

37. A proportioning pump as recited in claim 36, wherein said first and second linkage bearing surfaces each comprise hemispherical sockets formed in individual valve slide blocks attached to said linkage, said sockets receiving individual of said mounting balls to secure said springs to said valve slide blocks.

38. A proportioning pump as recited in claim 37, wherein said first and second drive bearing surfaces each comprise hemispherical sockets formed in individual spring shoes attached to said drive piston, said sockets receiving individual of said mounting balls to secure said springs to said valve slide blocks.

39. A proportioning pump as recited in claim 38, wherein said valve slide blocks are roller mounted and said spring shoes are directly mounted against said sides of said drive cylinder for movement longitudinal thereof.

40. A fluid driven proportioning pump for dispensing in a precise, predetermined ratio quantities of an externally pressurized drive fluid and a first and a second constituent fluid, said proportioning pump comprising:
  (a) a drive cylinder having closed ends;
  (b) a drive piston disposed in said drive cylinder and propelled by the drive fluid in a reciprocating motion comprising successive strokes of said drive piston in opposite directions, said drive piston separating said drive cylinder into a first and a second drive fluid chamber;
  (c) drive reversal means for admitting the pressurized drive fluid alternately into said first and said second drive fluid chambers to propel said drive piston in said reciprocating motion and thereby to positively displace drive fluid alternately from said second and first drive fluid chambers, respectively;
  (d) a pair of proportioning cylinders for the first constituent fluid, one of said proportioning cylinders opening opposite said drive piston into each of said first and second drive fluid chambers;
  (e) a pair of proportioning cylinders for the second constituent fluid, one of said proportioning cylinders opening opposite said drive piston into each of aid first and said second drive fluid chambers;
  (f) a constituent fluid passageway corresponding to each of said proportioning cylinders through which the constituent fluid corresponding thereto is admitted into and expelled therefrom;
  (g) a pair of proportioning pistons projecting from each side of said drive piston, said proportioning pistons extending into corresponding individual ones of said proportioning cylinders, whereby said reciprocating motion of said drive piston alternately advances and retracts said constituent fluid proportioning pistons within said corresponding ones of said proportioning cylinders to alternately draw thereinto and to positively displace therefrom precisely measured quantities of the constituent fluid corresponding thereto; and
  (h) ratio adjustment means for selectively varying the quantity of at least one of the constituent fluids drawn into and displaced from one of said proportioning cylinders by said proportioning piston corresponding thereto, said one of said proportioning cylinders defining a meterable proportioning cylinder.

41. A proportioning pump as recited in claim 40, wherein said ratio adjustment means comprises:
  (a) a proportioning piston head disposed in said meterable proportioning cylinder for advancement into and retraction within said meterable proportioning cylinder due to said reciprocating motion of said drive cylinder, said proportioning piston head having a front surface oriented toward said corresponding one of said meterable proportioning cylinder and a rear surface oriented toward said drive cylinder; and
  (b) means to permit waste movement of said drive piston relative to said proportioning piston head in each direction of said reciprocating motion of said drive cylinder.

42. A proportioning pump as recited in claim 41, wherein said means to permit waste movement comprises:
  (a) a footing projecting from said drive cylinder and having a bearing surface at the end thereof remote from said drive cylinder;
  (b) a proportioning piston shaft extending from said bearing surface and slidably passing through said proportioning piston head into said meterable proportioning cylinder; and
  (c) a radially enlarged retaining head on the end of said proportioning piston shaft within said meterable proportioning cylinder;
  said waste movement of said drive piston relative said proportioning piston head comprising movement of said drive piston toward said meterable proportioning cylinder from a first position of said drive piston relative said proportioning piston head in which said retaining head engages said front surface of said proportioning piston head to a second position of said drive piston relative to said proportioning piston head in which said bearing surface engages said rear surface of said proportioning piston head, and said waste movement of said drive piston relative said proportioning piston head further comprising movement of said drive piston away from said meterable proportioning cylinder from said second to said first position of said drive piston relative said proportioning piston head.

43. A proportioning pump as recited in claim 42, further comprising adjustment means to selectively vary the extent of said waste movement.

44. A proportioning pump as recited in claim 43, wherein said adjustment means comprises:
  (a) cooperating threading securing said proportioning piston shaft to said footing; and
  (b) a internal adjustment fitting on said retaining head by which said proportioning piston shaft may be rotated to vary the distance between said bearing surface and said retaining head.

45. A proportioning pump as recited in claim 44, further comprising external access means for selectively rotating said internal adjustment fitting on said retaining head from the exterior of said proportioning pump.

46. A proportioning pump as recited in claim 45, wherein said external access means comprises:
  (a) an adjustment opening formed through said plate assembly into said meterable proportioning cylinder opposite said proportioning piston head; and
  (b) an adjusting rod provided at one end thereof with an adjustment transfer tool for engaging said internal adjustment fitting and on the other end thereof with an external adjustment fitting by which said adjustment rod may be rotated, said adjusting rod slidably and rotatably mounted in said adjustment opening with said adjustment transfer tool directed toward said meterable proportioning cylinder for selective advancement thereinto to engage said internal adjustment fitting with said adjustment transfer tool and to rotate said proportioning piston shaft by rotating said external adjustment fitting from the exterior of said proportioning cylinder.

47. A proportioning pump as recited in claim 45, wherein said drive reversal means comprises:
  (a) a pressurized drive fluid passageway formed in each of said plate assemblies;

(b) a drive fluid exit passageway formed in each of said plate assemblies;

(c) first valve means for placing said first drive fluid chamber in communication alternately with said pressurized drive fluid passageway and with said drive fluid exit passageway formed in said plate assembly adjacent to said first drive fluid chamber;

(d) second valve means for placing said second drive fluid chamber in communication alternately with said pressurized drive fluid passageway and with said drive fluid exit passageway formed in said plate assembly adjacent to said second drive fluid chamber;

(e) linkage means for operating said first and second valve means in either a first or second operative mode, in said first operative mode said first drive fluid chamber being in communication with said pressurized drive fluid passageway formed in said plate assembly adjacent thereto and said second drive fluid chamber being in communication with said drive fluid exit passageway formed in said plate assembly adjacent thereto, and in said second operative mode said first drive fluid chamber being in communication with said drive fluid exit passageway formed in said plate assembly adjacent thereto and said second drive fluid chamber being in communication with said pressurized drive fluid passageway formed in said plate assembly adjacent thereto.

48. A proportioning pump as recited in claim 47, wherein said drive reversal means further comprises an over-center means for driving said linkage means to operate said first and second valve means between said first and said second operative modes responsive to completion of each of said successive strokes of said reciprocal motion of said drive piston.

49. A proportioning pump as recited in claim 48, wherein said over-center means is located in said drive cylinder.

50. A proportioning pump as recited in claim 48, wherein said first valve means comprises:
(a) a first valve bore extending from said first drive fluid chamber into said plate assembly adjacent thereto, said first valve bore communicating with said pressurized drive fluid passageway and said drive fluid exit passageway formed therein; and
(b) a first valve stem slidably mounted in said first valve bore and extending therefrom into said first drive fluid cylinder, said first valve stem having formed longitudinally therethrough a first valving passageway opening at one end thereof into said first drive fluid chamber in both said first and said second operative modes, the other end of said first valving passageway opening within said first valve bore at a location that communicates with said pressurized drive fluid passageway in said first operative mode and with said drive fluid exit passageway in said second operative mode.

51. A proportioning pump as recited in claim 50, wherein said second valve means comprises:
(a) a second valve bore extending from said second drive fluid chamber into said plate assembly adjacent thereto, said second valve bore communicating with said pressurized drive fluid passageway and said drive fluid exit passageway formed therein; and
(b) a second valve stem slidably mounted in said second valve bore and extending therefrom into said second drive fluid cylinder, said second valve stem having formed longitudinally therethrough a second valving passageway opening at one end thereof into said second drive fluid chamber in both said first and said second operative modes, the other end of said second valving passageway opening within said second valve bore at a location that communicates with said drive fluid exit passageway formed in said first operative mode and with said pressurized drive fluid passageway in said second operative mode.

52. A proportioning pump as recited in claim 51, wherein said linkage means comprises a valving shaft connecting said first and second valve stems and slidably passing through said drive piston, thereby to permit movement of said drive piston relative said valving shaft during said reciprocal motion thereof and whereby to permit movement of said valving shaft to drive said first and second valve means between said first and second operative modes.

53. A proportioning pump as recited in claim 48, wherein said over-center means comprises:
(a) a first linkage bearing surface rigidly attached to said linkage means on a first side of said drive piston;
(b) a first drive bearing surface rigidly attached to said drive piston on said first side thereof, said first drive bearing surface being movable in each successive stroke of said reciprocating motion of said drive piston into a center position relative said first linkage bearing surface in which said second drive bearing surface is maximally proximate thereto; and
(c) a first pair of resilient, C-shaped springs mounted in compression between said first linkage and first drive bearing surfaces, whereby said first pair of springs urge said first linkage bearing surface and said linkage means attached thereto into said first operative mode on the side of said center position of said first drive bearing surface adjacent said drive piston and into said second operative mode on the side of said center position of said first drive bearing surface remote from said drive piston.

54. A proportioning pump as recited in claim 53, wherein said over-center mechanism further comprises:
(a) a second linkage bearing surface rigidly attached to said linkage means on a second side of said drive piston opposite from said first side thereof;
(b) a second drive bearing surface rigidly attached to said drive piston on said second side thereof, said second drive bearing surface being movable in each successive stroke of said reciprocating motion of said drive piston into a center position relative said second linkage bearing surface in which said second drive bearing surface is maximally proximate thereto; and
(c) a second pair of resilient, C-shaped springs mounted in compression between said second linkage and second drive bearing surfaces, whereby said first pair of springs urge said second linkage bearing surface and said linkage means attached thereto into said first operative mode on the side of said center position of said second drive bearing surface remote from said drive piston and into said second operative mode on the side of said center position of said second drive bearing surface adjacent said drive piston.

55. A proportioning pump as recited in claim 54, wherein said linkage tearing surfaces and said drive bearing surfaces are so positioned relative each other that in each successive stroke of said reciprocating motion of said drive piston said drive bearing surface that follows said drive piston reaches said center position thereof prior to said drive bearing surface that leads said drive cylinder reaching said center position thereof.

56. A proportioning pump as recited in claim 54, wherein said first and second drive bearing surfaces each comprise a spring receiving slot formed in individual spring shoes attached to said drive piston.

57. A proportioning pump as recited in claim 54, wherein said each of first and second springs comprise a resilient open loop of ambit greater than 180 degrees.

58. A proportioning pump as recited in claim 54, wherein said first and second linkage bearing surfaces each comprise a spring receiving slot formed in individual valve slide blocks attached to said linkage means.

59. A proportioning pump as recited in claim 58, wherein said valve slide blocks are roller mounted against said sides of said drive cylinder for movement longitudinal thereof.

* * * * *

UNITED STATES PATENT AND TRADEMARK OFFICE
CERTIFICATE OF CORRECTION

PATENT NO. : 5,058,768

DATED : October 22, 1991

INVENTOR(S) : WILLIAM H. LICHFIELD

It is certified that error appears in the above-identified patent and that said Letters Patent is hereby corrected as shown below:

```
    Abstract, lines 8-9, "porportioning" should be --proportioning--
    Column 1, line 29, after "preparations" insert --.--
    Column 1, line 29, "retial" should be --retail--
    Column 1, line 55, "moire" should be --more--
    Column 1, line 65, "undergoes markedly" should be --undergoes a
markedly--
    Column 2, line 15, "DEvices" should be --Devices--
    Column 2, line 19, after "for" insert --additional driving
power and causing normal operation to--
    Column 2, line 48, "down time" should be --downtime--
    Column 2, line 60, "systems" should be --system--
    Column 25, line 16, "fluid drive" should be --fluid driven--
    Column 5, line 52, "by" should be --By--
    Column 5, line 62, "portioning" should be --proportioning--
    Column 5, line 67, after "motion" insert --and--
    Column 6, line 23, after "only" insert --typical embodiments of
the invention and are therefore not to--
    Column 7, line 21, "container" should be --containers--
    Column 7, line 35, "proportionate pump" should be --proportioning pump--
    Column 8, line 16, after "and" insert --is--
    Column 8, line 22, "pump 1-" should be --pump 10--
    Column 8, line 38, "if" should be --of--
    Column 8, line 56, "piton" should be --piston--
    Column 11, line 25, "the quantify" should be --the quantity--
    Column 11, line 32, "int he" should be --in the--
    Column 11, line 46, "are" should be --is--
```

UNITED STATES PATENT AND TRADEMARK OFFICE
CERTIFICATE OF CORRECTION

PATENT NO. : 5,058,768

DATED : October 22, 1991

INVENTOR(S) : WILLIAM H. LICHFIELD

It is certified that error appears in the above-identified patent and that said Letters Patent is hereby corrected as shown below:

```
    Column 12, line 29, "quantify" should be --quantity--
    Column 12, line 32, "eh" should be --the--
    Column 12, lines 38-39, "incomplete detail" should be --in
complete detail--
    Column 12, line 60, "quantify" should be --quantity--
    Column 13, line 11, "encounter" should be --encounters--
    Column 13, line 35, "grater" should be --greater--
    Column 14, line 20, "ont eh" should be --on the--
    Column 14, lines 44-45, "screw driver" should be --screwdriver--
    Column 19, line 41, "n" should be --in--
    Column 20, line 9, after "maintenance" insert --.--
    Column 20, line 13, "down time" should be --downtime--
    Column 20, line 27, after "case" insert --.--
    Column 20, line 41, "AT" should be --At--
    Column 22, lines 56-66, subparagraph (E) should be lined up with
other subparagraphs
    Column 25, line 8, "internally adjustment" should be --internal
adjustment--
    Column 27, line 7, "(C)" should be --(c)--
    Column 28, line 37, "cylinder" should be --cylinders--
    Column 29, line 29, "aid" should be --said--
    Column 33, line 32, "aid" should be --said--
    Column 34, line 39, "a internal" should be --an internal--
```

UNITED STATES PATENT AND TRADEMARK OFFICE
CERTIFICATE OF CORRECTION

PATENT NO. : 5,058,768
DATED : October 22, 1991
INVENTOR(S) : WILLIAM H. LICHFIELD It is certified that error appears in the above-indentified patent and that said Letters Patent is hereby corrected as shown below:

Column 37, line 2, "tearing" should be —bearing—

Signed and Sealed this

Fourth Day of January, 1994

Attest:

BRUCE LEHMAN

Attesting Officer

Commissioner of Patents and Trademarks